United States Patent
Weinstein et al.

(10) Patent No.: US 7,184,610 B2
(45) Date of Patent: *Feb. 27, 2007

(54) MINIATURIZED MICROSCOPE ARRAY DIGITAL SLIDE SCANNER

(75) Inventors: Ronald S. Weinstein, Tucson, AZ (US); Michael R. Descour, Tucson, AZ (US); Chen Liang, Tucson, AZ (US); Peter H. Bartels, Tucson, AZ (US); Roland V. Shack, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 356 days.

This patent is subject to a terminal disclaimer.

(21) Appl. No.: 10/637,486

(22) Filed: Aug. 11, 2003

(65) Prior Publication Data

US 2004/0101210 A1    May 27, 2004

Related U.S. Application Data

(63) Continuation of application No. PCT/US02/08286, filed on Mar. 19, 2002.

(60) Provisional application No. 60/276,498, filed on Mar. 19, 2001.

(51) Int. Cl.
    G06T 5/50       (2006.01)
    G02B 21/18      (2006.01)
(52) U.S. Cl. .................. 382/284; 359/374; 382/128
(58) Field of Classification Search .......... 382/141, 382/128, 284; 359/368, 372, 373, 374
See application file for complete search history.

(56) References Cited

U.S. PATENT DOCUMENTS 2,844,992 A  *  7/1958  Bernhardt ............. 359/661
3,661,446 A  *  5/1972  Mori et al. ............ 359/657

(Continued)

FOREIGN PATENT DOCUMENTS

WO    WO 02/056084    7/2002
WO    WO 02/056256    7/2002

OTHER PUBLICATIONS

Jose M. Sasian et al., "Design approaches with a lenslet array and a single, high-numerical-aperture annular-field objective lens for optical data storage systems that incorporate large numbers of parallel read-write-erase channels", Mar. 1, 1999, vol. 38, No. 7, Applied Optics, pp. 1163-1168.
U.S. Appl. No. 10/243,648, filed Sep. 16, 2002, Weinstein et al.
U.S. Appl. No. 10/637,486, filed Aug. 11, 2003, Weinstein et al.

*Primary Examiner*—Thomas D. Lee
(74) *Attorney, Agent, or Firm*—Antonio R. Durando

(57) ABSTRACT

An array of microscopes and a method of imaging an object with the array of microscopes. The array includes a plurality of optical elements being individually disposed with respect to a corresponding image plane and configured to image respective sections of an object, and includes a plurality of image sensors corresponding to respective optical elements and configured to capture corresponding representations of the respective sections of the object. The method includes imaging respective sections of an object with a plurality of optical elements and capturing corresponding representations of sections of the object from a plurality of image sensors.

70 Claims, 22 Drawing Sheets

U.S. PATENT DOCUMENTS

| | | |
|---|---|---|
| 4,149,090 A | 4/1979 | Agulnek |
| 4,168,900 A | 9/1979 | Adachi |
| 4,448,499 A | 5/1984 | Tokumaru |
| 4,561,731 A * | 12/1985 | Kley ............................ 349/1 |
| 4,675,727 A | 6/1987 | Sekizawa et al. |
| 4,692,812 A | 9/1987 | Hirahara et al. |
| 4,725,890 A | 2/1988 | Yaniv et al. |
| 4,728,803 A | 3/1988 | Catchpole et al. |
| 4,734,787 A | 3/1988 | Hayashi |
| 4,879,250 A | 11/1989 | Chan |
| 4,899,226 A | 2/1990 | Tanimoto et al. |
| 5,055,894 A | 10/1991 | Chan |
| 5,144,448 A | 9/1992 | Hornbaker, III et al. |
| 5,163,117 A | 11/1992 | Imanishi et al. |
| 5,260,826 A | 11/1993 | Wu |
| 5,270,859 A | 12/1993 | Wirth et al. |
| 5,517,279 A | 5/1996 | Hugle et al. |
| 5,532,845 A | 7/1996 | Gusmano |
| 5,648,874 A | 7/1997 | Sawaki et al. |
| 5,659,425 A * | 8/1997 | Suzuki ...................... 359/658 |
| 5,768,023 A | 6/1998 | Sawaki et al. |
| 5,787,107 A | 7/1998 | Leger et al. |
| 5,796,522 A | 8/1998 | Meyers |
| 5,877,492 A | 3/1999 | Fujieda et al. |
| 5,973,844 A | 10/1999 | Burger |
| 6,016,185 A | 1/2000 | Cullman et al. |
| 6,057,586 A | 5/2000 | Bawolek et al. |
| 6,088,164 A | 7/2000 | Fukasawa |
| 6,094,411 A | 7/2000 | Matsuda et al. |
| 6,124,974 A | 9/2000 | Burger |
| 6,128,139 A * | 10/2000 | Fukutake ................... 359/661 |
| 6,133,986 A | 10/2000 | Johnson |
| 6,181,441 B1 | 1/2001 | Walsh |
| 6,281,034 B1 | 8/2001 | Sugimoto et al. |
| 6,320,174 B1 * | 11/2001 | Tafas et al. ............... 250/208.1 |
| 6,343,162 B1 | 1/2002 | Saito et al. |
| 6,348,981 B1 | 2/2002 | Walsh |
| 7,116,437 B2 * | 10/2006 | Weinstein et al. ......... 358/1.15 |
| 2001/0012069 A1 * | 8/2001 | Demdinger et al. ........ 348/295 |
| 2002/0090127 A1 | 7/2002 | Wetzel et al. |

* cited by examiner

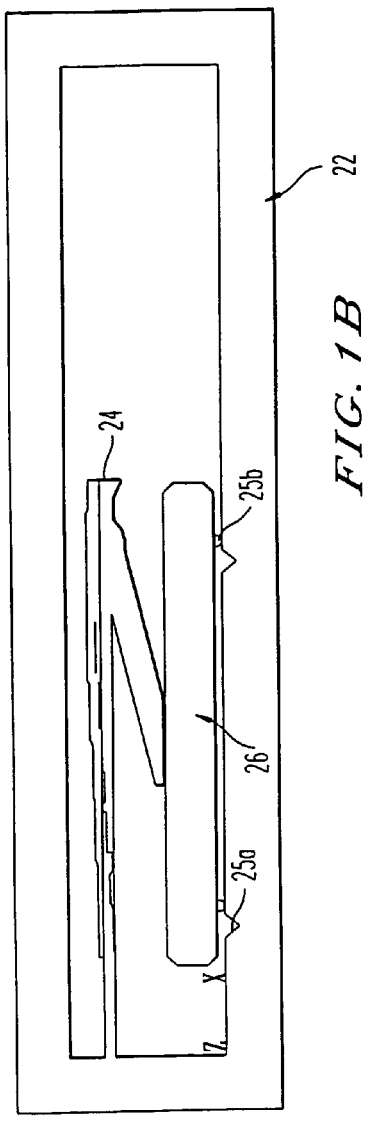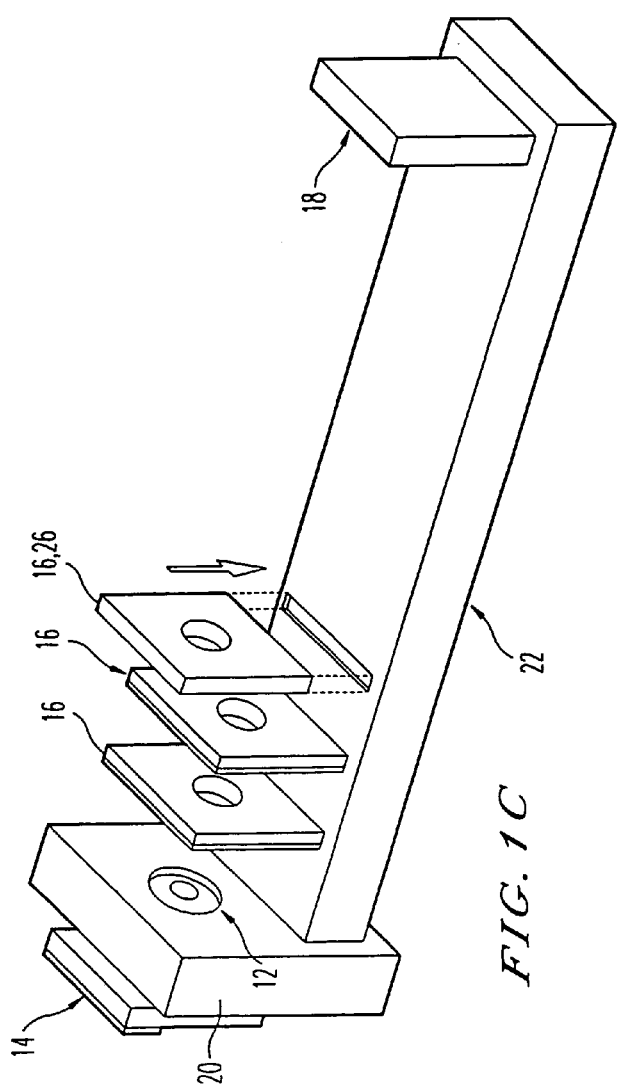

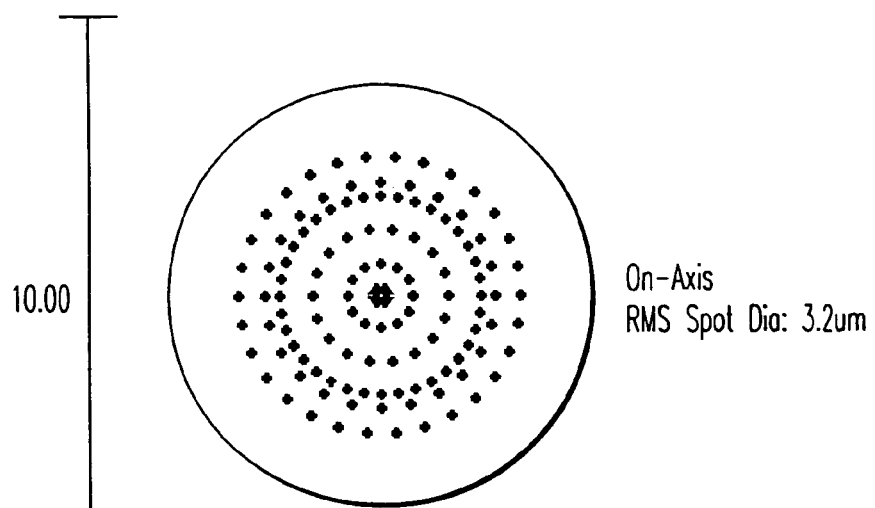
FIG. 4A — On-Axis RMS Spot Dia: 3.2um
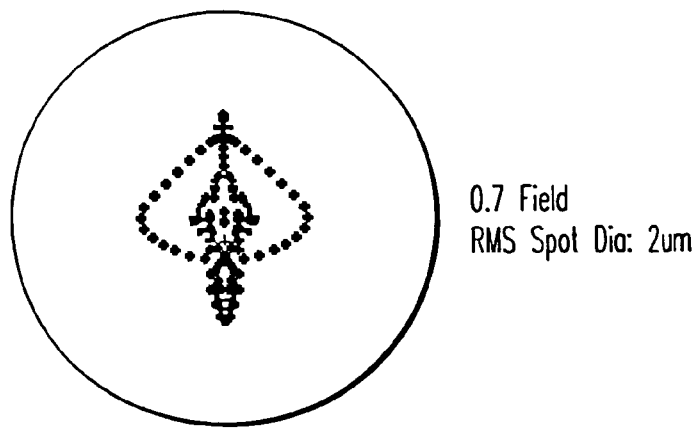
FIG. 4B — 0.7 Field RMS Spot Dia: 2um
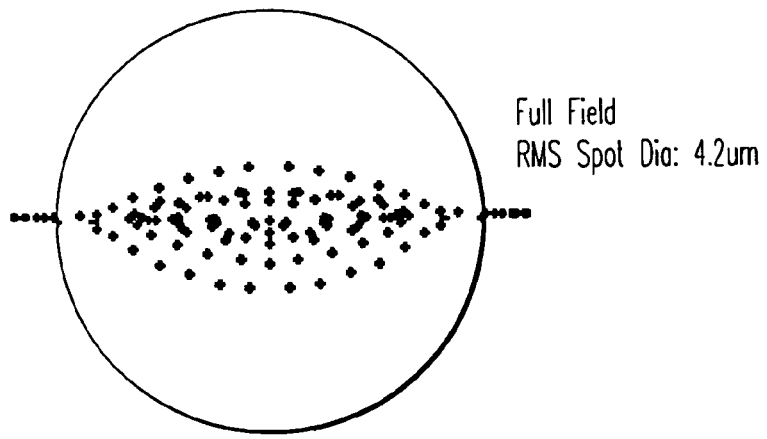
FIG. 4C — Full Field RMS Spot Dia: 4.2um

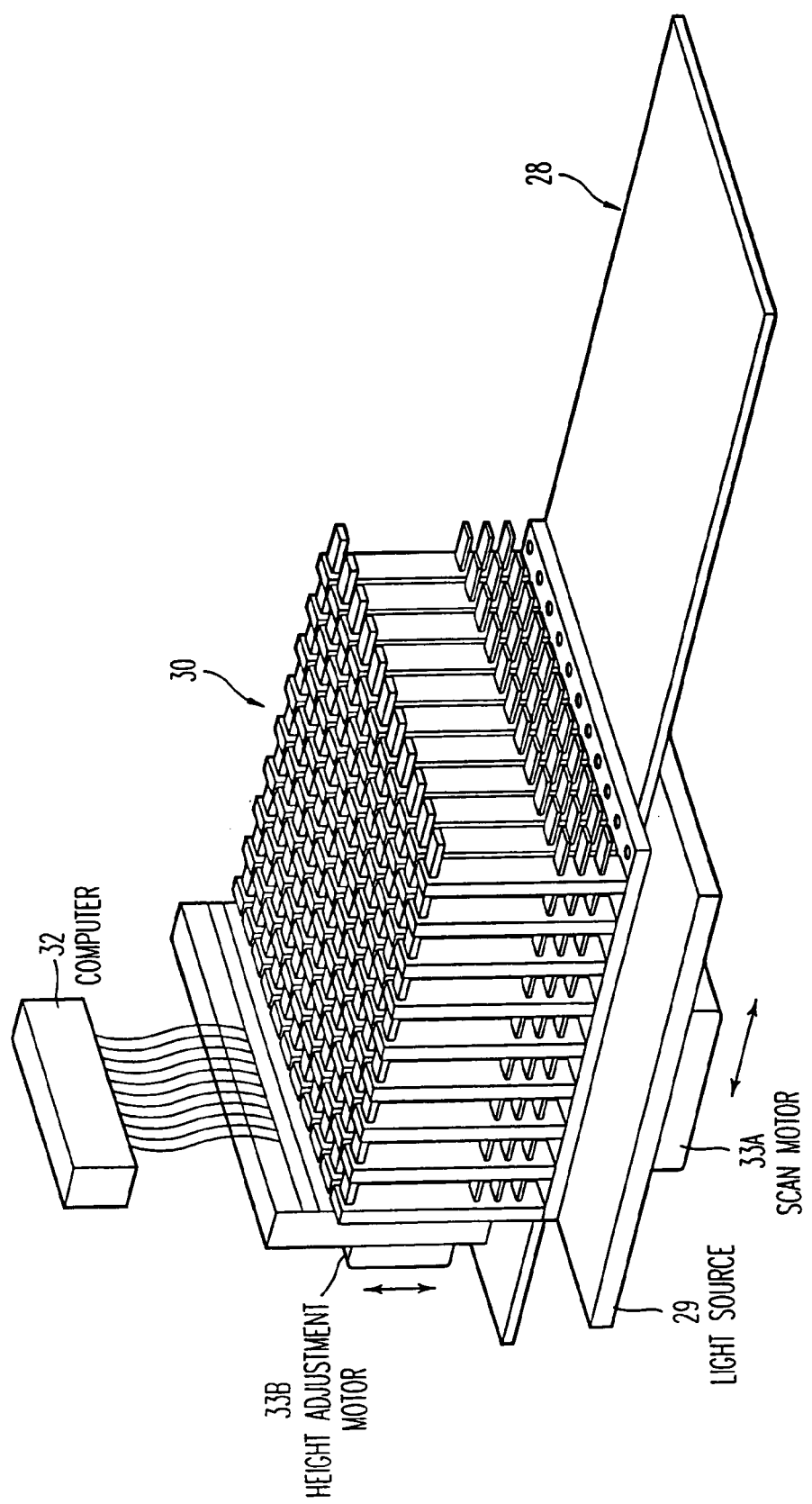

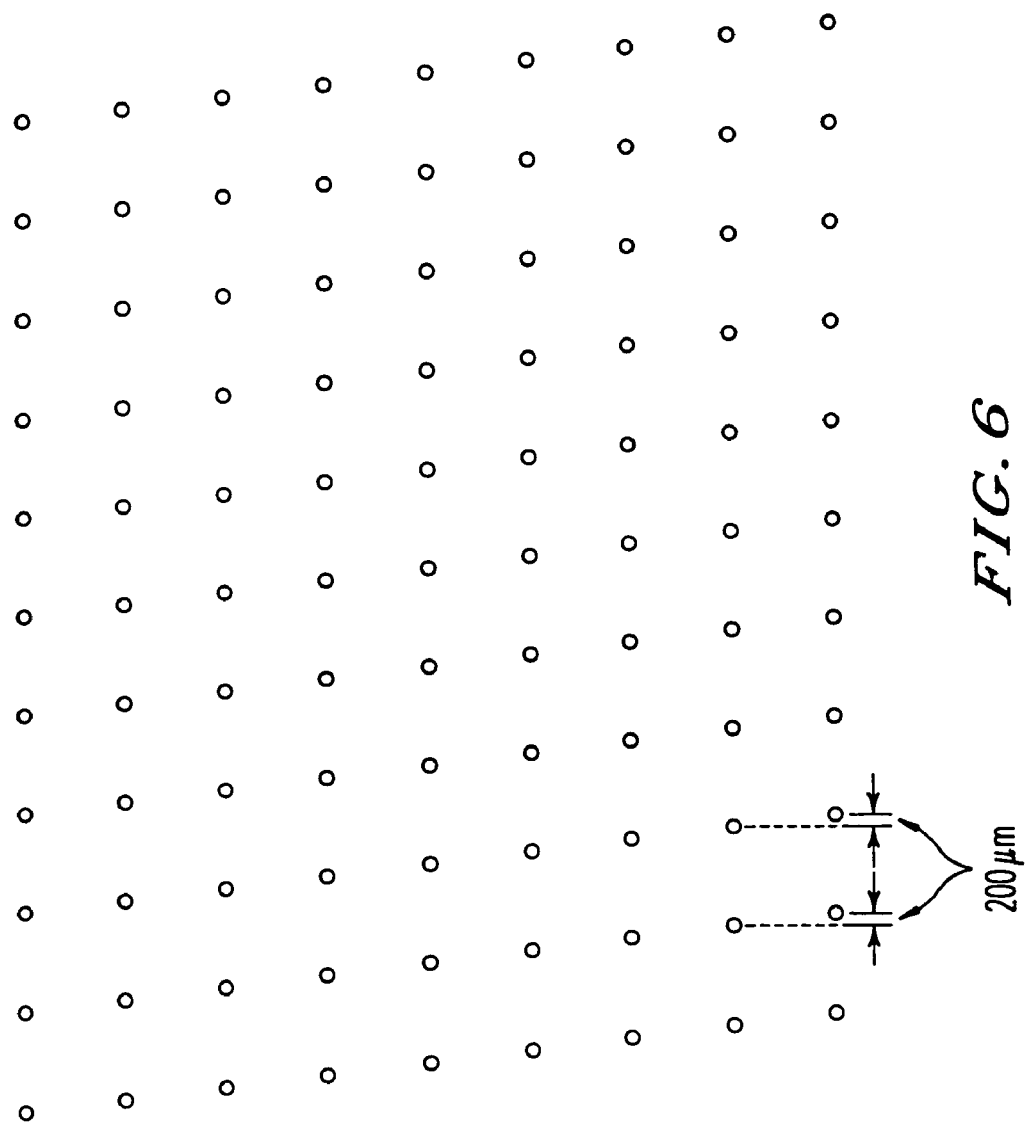

MINIATURIZED MICROSCOPE ARRAY DIGITAL SLIDE SCANNER

CROSS REFERENCE TO RELATED APPLICATIONS

This application claims benefit of priority under 35 U.S.C. §119 to U.S. Provisional Application No. 60/276,498 filed on Mar. 19, 2001, the entire contents of which are incorporated by reference.

BACKGROUND OF THE INVENTION

1. Field of the Invention

The present invention relates to the field of light microscopy. More particularly, this invention relates to a microscope array for scanning an object at high resolution or projecting a pattern onto a surface of an object.

2. Description of the Related Art

Pathologists are physicians responsible for analyzing tissue specimens, fine-needle aspirates of tissues, cytology specimens, and liquid specimens such as urine and blood by light microscopy. Analysis of specimens frequently is accomplished by viewing specimens on slides through a light microscope or by viewing electronic images of the specimens on a video monitor. Video images can be obtained by mounting a video camera on a conventional light microscope and capturing images in either an analog or a digital imaging mode. Microscopes with motorized stages translate slides to move one portion of the specimen on the slide into a field of view of the microscope and then translate to move another portion of the specimen into the field of view. Microscopic digital images of entire specimens can be assembled from the individual digital images. Light microscopes have a field of view (FOV) measuring from 10's of microns to millimeters in diameter, depending on the transverse magnification of the objective. To image an entire standard microscope slide (i.e., a 20 mm by 50 mm microscope slide) requires a conventional light microscope to scan back and forth multiple times. The scanning process is time intensive. As a result, all portions of the pathological specimen are not imaged. Rather, the pathologist depends on statistics to determine a normal or an abnormal culture. Digital images of a percentage of the pathological specimen are scanned and captured in a matter of minutes using the conventional motorized light microscope.

While it is possible to design an optical system with a single optical pathway which has a FOV comparable to the microscope slide width, such a design requires a very large objective lens which in turn produces a large imaging system requiring substantial stabilization of the microscope during scanning and imaging. As a result, microscopes with smaller objectives and smaller FOVs have been used, and a subsample of a few thousand fields of the pathological sample may be relied upon to represent the histopathology, cytopathology, or histomorphology of the specimen. The complete pathological sample is not necessarily viewed which can be suboptimal for medical purposes.

SUMMARY OF THE INVENTION

One object of the present invention is to provide an imaging system which can rapidly scan microscopy specimens and produce a composite image of entire specimens.

Another object of the present invention is to provide an imaging system with near diffraction-limited optical performance such that the clarity of the images is not degraded by wave-front aberrations, ray aberrations, or chromatic aberrations.

Still another object of the present invention is to provide an imaging system in which specimens with topography variations or thicknesses greater than the depth of field of the optical microscope can be imaged.

Yet another object of the present invention is to provide an imaging system in which color contrasts can be imaged.

Another object of the present invention is to provide an imaging system in which the entire width of a specimen such as for example a specimen on a standard 20 mm×50 mm microscope slide area can be imaged in a single scan.

Still another object of the present invention is to image the entire microscopy specimen in which the histopathology, cytopathology, histomorphology, or other related properties, of the specimen can be studied.

These and other objects of the present invention are achieved with an array of microscopes and a method of imaging an object with the array of microscopes. The array includes a plurality of optical elements (e.g. a microscope objective lens) configured to image respective sections of an object and disposed with respect to a corresponding image plane so as to produce a magnified image of a respective section of the object at the corresponding image plane. The array includes a plurality of image sensors corresponding to respective optical elements and configured to capture corresponding representations of sections of the object.

The method includes imaging respective sections of an object with a plurality of optical elements and capturing corresponding representations of sections of the object from a plurality of image sensors. The method involves for example producing a relative scanning motion between an array of microscopes and the object so that the array of microscopes scans the object either longitudinally or, alternatively, laterally relative to the long dimension of the object, and generates an image signal corresponding to images from each microscope, capturing the image signals, and concatenating the image signals into a composite image.

The image in each field of view of the optical element can be digitally imaged. Using the planar microscope array (MA) of the present invention, large areas of a pathological specimen (i.e. the object) can be imaged at high resolution. In the imaging process, the MA moves along a longitudinal direction of a glass slide and stops momentarily and repeatedly to acquire images of adjacent portions of the object. Alternatively, in the imaging process, the MA is stationary and a glass slide moves along a longitudinal direction of the glass slide and stops momentarily and repeatedly while the MA acquires images of adjacent portions of the object. Alternatively, the MA can be translated continuously relative to the stationary glass slide. Alternatively, the glass slide can be translated continuously relative to a stationary MA. Images from each microscope element in the MA are collected and stored in an electronic medium. In one embodiment of the present invention, the images from each microscope element are processed and concatenated into a composite digital file. The composite digital file can be retrieved for example at a workstation, navigated with a browser, and viewed in its entirety.

In the present invention, each individual microscope has a small field of view (FOV). When multiple microscopes are packaged in an array, then a FOV comparable to the width of a slide containing the pathological specimen can be achieved. In one embodiment of the present invention, the MA system is constructed to have a FOV that covers the entire width of a microscope slide. In this embodiment, only a single scan pass is needed to form a digital image of the entire microscope slide.

According to one aspect of the present invention, the refractive plates have lithographically printed, embossed, molded, or laser-printed corrective elements such as for example lenslets or aspherical lenses or diffractive components. The lithographically printed corrective elements are fabricated by a sol-gel process. The sol gel process utilizes UV-activated sol gels and UV photomask exposure and developing to define the corrective optical elements on the surface of the refractive plates. The laser-printed corrective optical elements are fabricated by a sol-gel process which utilizes laser writing to define the corrective optical elements on the refractive plates.

According to another aspect of the present invention, the corrective optical elements are made individually from materials having substantially different indices of refraction.

According to a further aspect of the present invention, a set of composite refractive plates including all the corrective optical elements and a composite base plate including all the objective lenses are aligned and assembled to constitute an MA assembly.

According to one aspect of the present invention, the objective lens and the at least one refractive plate define an imaging system with a transverse-magnification magnitude ranging from |m|>1.

According to another aspect of the present invention, the objective lens and the at least one refractive plate define an imaging system with a transverse-magnification magnitude ranging from |m|>0 to |m|<1.

According to another aspect of the present invention, the objective lens is held by a base plate that houses the objective lens. The base plate can be a silicon substrate. The base plate can contain multiple objective lenses. The base plate can be made from materials other than silicon such as for example glass and plastics (e.g., polymethyl methacrylate PMMA, polystyrene, polycarbonate, acrylic, and cycloolefine copolymer COC).

According to one aspect of the present invention, the objective lens is at least one of a plano-convex lens, a biconvex lens, a concave-convex lens, and a spherical lens. The objective lens can have at least one conically-derived surface such as for example a hyperboloidal surface. The objective lens can be made from a glass having a spatially varying index of refraction such as for example of Nippon Sheet Glass gradient index lens glass, and Lightpath GRADIUM® glass. Further, the spherical lens can include an aspherical departure. For example, the ball lens can include aspherical surfaces such as an aspheric cap.

According to one aspect of the present invention, the objective lens and a refractive plate define a dry imaging system with a numerical aperture (NA) within a range from NA=0.05 to NA<1.0.

According to another aspect of the present invention, the objective lens and a refractive plate define an immersion imaging system with a numerical aperture (NA) within a range from NA=0.05 to NA=0.95 n, where n is the index of refraction of the immersion medium. Common immersion media are water (n=1.33) and microscope immersion oil (n=1.515) available from Cargille Laboratories Inc., Cedar Grove, N.J.

According to one aspect of the present invention, a micro-optical table is configured to locate and fix positions of a base plate holding the objective lens, the refractive plate, and the image sensor. The attachment of the base plate, the refractive plate, and the image sensor to the micro-optical table is assisted by or secured by a silicon spring, integrally fabricated into slots in the micro-optical table.

According to another aspect of the present invention, the refractive plate is attached to the micro-optical table. The refractive plate can include a cubic phase optical element permitting the MA to image objects with substantial topography variations or topography beyond the depth of field or thickness beyond the depth of field of any one of the individual microscopes. Further, the refractive plate can include a material with an electronically controllable refractive index, permitting dynamic focusing of the microscope array at multiple depths into or on the object. The refractive plate can be a continuous plate sheet or can be a series of segmented plates.

According to one aspect of the present invention, the optical axes of the microscope are arranged on a staggered grid such that a field of view of one microscope in a column partially overlaps a field of view of another microscope in the column if translated longitudinally. According to another aspect of the present invention, the MA is configured to translate both longitudinally along the length of the object and axially away from the object. The translational motion scans the microscope slide to generate individual images of the object which can be concatenated into a composite image. The axial motion permits focusing and scans of thick objects or objects of varying topography such that scans at different axial heights above the sample can yield, when processed, a composite three-dimensional image of the object.

According to another aspect of the present invention, the image sensor includes a photodetector array. The photodetector array can be segmented parallel to the optical axis of the microscopes or the photodetector array can be tilted off-axis of the microscopes in a staircase configuration, permitting simultaneous imaging of objects at different depths into or above a specimen surface, yielding a composite three-dimensional image.

According to another aspect of the present invention, the image sensor includes a linear photodetector array or multiple linear photodetector arrays located in an image plane of the MA such that scanning of the MA across the sample forms line-by-line images of the object which are concatenated into a composite image of the object.

According to another aspect of the present invention, the image sensor includes multiple linear photodetector arrays located in an image plane of the MA with each linear photodetector array having a spectral color filter or a spectral band-width filter such that scanning of the MA across the sample forms line-by-line images of the object which are concatenated into a composite color image of the object.

According to another aspect of the present invention, the MA can include a light source which is used in either a transillumination or an epi-illumination configuration. In the transillumination configuration, the object can be illuminated by means of an array of light emitting diodes (LEDs). A diffusing surface can be placed between the LEDs and the object to improve the uniformity of illumination and to fill the numerical aperture of the microscopes. The diffusing surface can be opal glass. In the epi-illumination configuration, light form the light source can be transmitted to the object by fiber-optic or slab waveguides on a base plate incorporating the miniature microscope objectives or the objective lenses.

According to another aspect of the present invention, the MA further includes a scan motor to drive the MA longitudinally across the object and a height-adjustment motor to adjust an axial distance from the objective lens to the object.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein:

FIG. 1B is a schematic depiction of a silicon clip locating an optical element in a slot on a micro-optical table;

FIG. 1C is a schematic depiction illustrating the assembly of a refractive plate onto the micro-optical table;

FIGS. 4A–4C are schematics of the optical performance of the optical design layout shown in FIG. 3;

FIG. 5A is an isometric view of a MA with 99 microscopes;

FIG. 6 is a schematic depicting a composite layout of the fields of view for the 99 microscopes depicted in FIGS. 5A and 5B;

DETAILED DESCRIPTION OF THE PREFERRED EMBODIMENTS

Early techniques for scanning slides of pathological specimens relied on a single microscope objective and were frustrated by the time required to repetitively image at high magnification small portions of the specimen and step across the entire surface of the specimen. These systems were further frustrated by slow data transfer rates available at the time. For example, typical video frame transfer rates were approximately 6 MHz whereas presently digital data bus transfer data at rates near 100 MHz.

Meanwhile the MA of the present invention alleviates these problems. Images of an entire specimen can be acquired in a reasonable time frame. The pathologist can, if desired, inspect the entire specimen, and reexamine suspect areas of the specimen. With the near 100 MHz transfer rates available on present computers, it is possible to collect and concatenate images from the entire specimen and produce monochromatic and polychromatic images of the pathological specimen within seconds. Further, with the MA of the present invention, reexamination of suspect areas can occur at different focal planes from the original scan and can even give the pathologist a reconstructed three-dimensional view of the suspect area. The digital images of the specimen can be viewed locally or transmitted over a telecommunications system, such as for example the Internet.

Figure 1A:
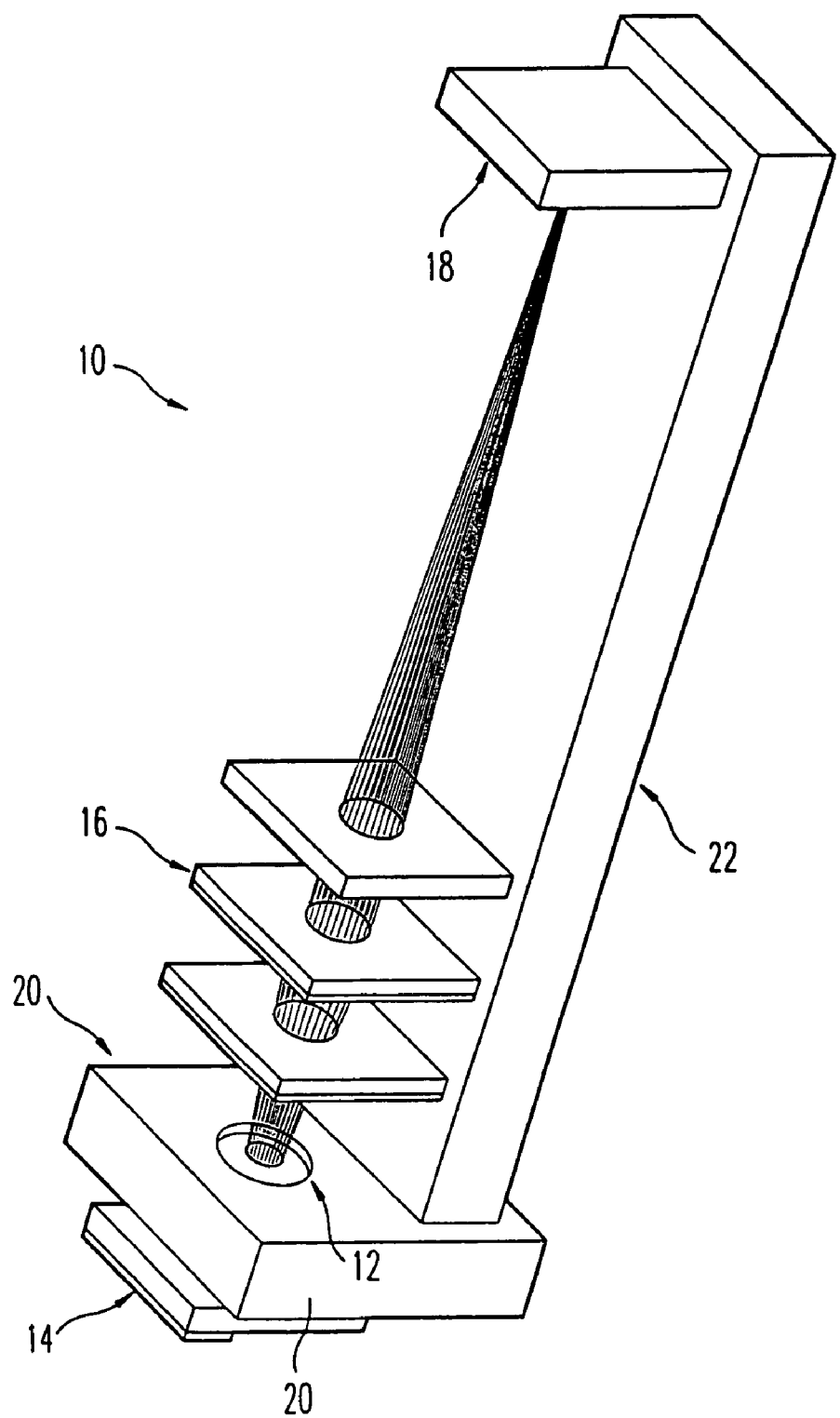
FIG. 1A is a schematic depiction of a single miniaturized microscope in a MA.

As previously noted, the MA of the present invention includes an array of miniaturized microscopes such that the MA is configured to scan an entire microscope slide containing an object (i.e., the pathological specimen). Referring now to the drawings, wherein like reference numerals designate identical or corresponding parts throughout the several views, FIG. 1A shows a schematic of an individual miniaturized microscope 10. Each microscope 10 includes a plurality of optical elements such as for example an objective lens 12 adjacent to a cover plate 14 and at least one refractive plate 16, and includes an image sensor 18. The optical elements include for example lenses, collimators, spreading optics, and other focussing elements configured to configured to image respective sections of an object and to produce an image of a respective section of the object at a corresponding image plane A specimen (i.e., the object to be imaged) is located beneath the cover plate 14. Qualitatively, the use of multiple refractive plates 16 increases the field of view and improves image quality of each microscope 10. In addition, the objective lens 12 and at least one additional optical element (i.e. the at least one refractive plate 16) function together as one optical system, designed to control aberrations. This combinational approach differs from an approach in which one individual lens element, such as for example a biaspherical objective lens such as the one disclosed by J. M. Sasian et al., Applied Optics 38, pp. 1163–1168 (1999), the entire contents of which are incorporated herein by reference, is designed to exhibit minimal aberrations. Further, multiple lens elements in a miniature microscope allow correction to various aberrations in the microscope and add flexibility to the manufacturability and cost of the optical system.

For example, a relatively low-cost spherical lens (derived from a ball lens) can be combined with an aspheric-surface lithographically-patterned corrective optic to achieve the same spherical aberration correction as would be achieved in a more expensive and exacting hyperboloidal lens such as the biaspherical objective lens of Sasian et al.

While an increased number of optical components can increase the field of view and improve image quality and can alleviate the cost and exacting precision required for the manufacture of single hyperboloidal lens, there is an upper limit to the number of optical components to be utilized in each microscope. The upper limit is dictated by the practicality of accurately assembling multiple plates and lenses.

The combination of a glass lens (e.g., a plano-convex glass lens as the objective lens) and three refractive lens plates, shown in FIG. 1A, represents a suitable combination of manufacturable, relatively low-cost components yielding near diffraction-limited performance.

In one embodiment of the present invention, the objective lens 12 is held by a base plate 20 which can be a silicon substrate, a glass substrate, a poly-(methylmethacrylate) (PMMA) substrate, or a polymer substrate. The objective lens held in the base plate can be made from a Nippon Sheet Glass (NSG) gradient index (GRIN) glass or and GRADIUM® glass. The GRIN and GRADIUM® glasses having spatially varying indices of refraction add more design flexibility to the characteristics of the objective lens 12. Trans-illumination of the object along the field of view or epi-illumination peripheral to the field of view along the base plate 20 illuminates the object for each miniaturized microscope. As shown in FIG. 1A, a micro-optical table 22 (MOT) serves as support for each microscope. The MOT 22 supports the base plate 20, the at least one refractive plates 16, and the image sensor 18. According to the present invention, a silicon substrate can be utilized as the base plate 20. Optical elements such as for example lenses, fiber optics, mirrors, and detectors can be mounted on the base plate 20.

FIGS. 1B and 1C are schematic depictions of one embodiment of the present invention whereby a silicon spring 24 holds in place an arbitrary optical element 26 such one of the refractive plates 16. A slot, as shown in FIG. 1B, is fabricated into the MOT 22 and provides clearance to one side of the slot such that the optical element 26 can enter the slot, as shown in FIG. 1C, be slid across the slot, and be located by indentations 25a in the slot and protrusions 25b on the optical component 26 engage to precisely locate the optical component in the slot. Lithographic techniques are used to define the precise positions of the slots, the indentations 25a and the protrusions 25b. Spring tension by the silicon clip holds the optical component 26 in the slot. Once the optical component is located optical cement can be used to adhere the optical component to the MOT substrate. The design and use of silicon springs to position and hold optical elements is disclosed by M. R. Descour, et al., in "Toward the development of miniaturized imaging systems for detection of pre-cancer," IEEE Journal of Quantum Electronics, vol.38, No. 2, pp. 122–130 (February 2002), the entire contents of which are incorporated herein by reference.

Figure 2:
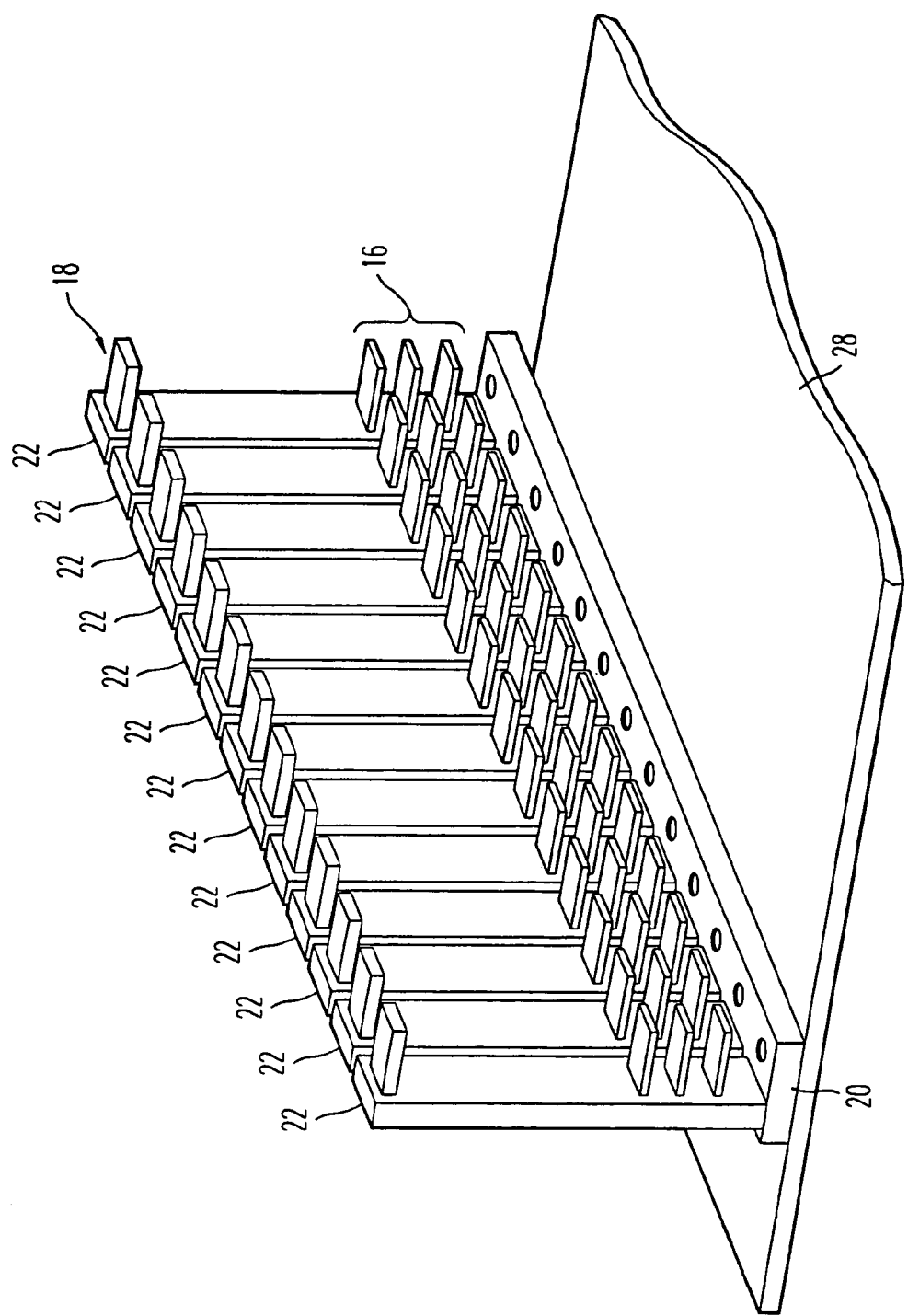
FIG. 2 is a schematic depiction of a row of 13 miniaturized microscopes.

FIG. 2 is a schematic depiction of a linear array of 13 microscopes attached with individual micro-optical tables 22 to a composite base plate 20. The image sensors 18 are positioned at an image plane of individual microscope objectives. However, the present invention is not limited to situations in which all of the image sensors are in the same plane but can include situations where some of the sensors are offset from the image plane. The linear array of microscopes depicted in FIG. 2 can scan long the entire width of the microscope slide 28 to acquire images of the object on the microscope slide 28. The MA of the present invention is a zero-alignment optical system. In practice, zero-alignment can be achieved when assembly errors are smaller than the tolerances required for optical performance of the miniature microscope array. For example, assembly and lithography errors in the above-noted method for assembly of the MA using the silicon springs are small enough to expect an optical-element alignment accuracy of ±3 μm in translation and ±0.5 mrad in rotation for a singular microscope optical element.

Figure 3:
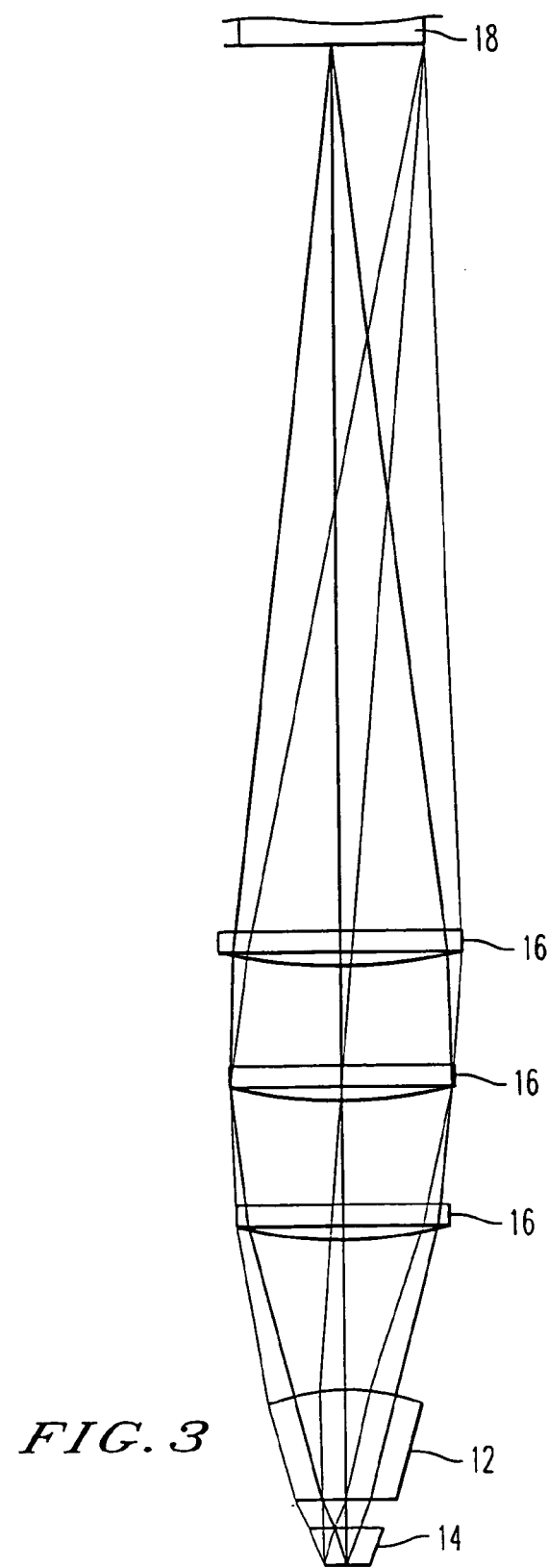
FIG. 3 is a schematic of an optical design layout for a single miniaturized microscope objective.

FIG. 3 is a schematic of an optical design layout for a single miniaturized microscope. In this design, each microscope has a FOV of 250 μm in diameter, a numerical aperture (NA) of NA=0.4, and a transverse magnification of m=−4. The optical design was facilitated with optical-design software such as for example ZEMAX®. Table 1 discloses the optical design of the NA=0.4 microscope objective shown in FIG. 3.

TABLE 1

| Surface | Radius of Curvature (mm) | Thickness (mm) | Glass Type | Diameter (mm) | Conic Constant | 2nd order (mm$^{-1}$) | 4th order (mm$^{-3}$) |
|---|---|---|---|---|---|---|---|
| OBJ | Infinity | 0.170 | BK7 | 0.200 | 0.00 | | |
| 1 | Infinity | 0.130 | | 0.298 | 0.00 | | |
| 2 | Infinity | 0.500 | SF59 | 0.419 | 0.00 | | |
| 3 | −1.056 | 0.717 | | 0.619 | 0.00 | | |
| 4 | 1.789 | 0.050 | BK7 | 0.846 | −0.91 | | |
| 5 | Infinity | 0.100 | BK7 | 0.846 | 0.00 | | |
| 6 | Infinity | 0.500 | | 0.847 | 0.00 | | |
| STO | 2.012 | 0.050 | BK7 | 0.891 | 0.00 | | |
| 8 | Infinity | 0.100 | BK7 | 0.891 | 0.00 | | |
| 9 | Infinity | 0.500 | | 0.901 | 0.00 | | |
| 10 | Infinity | 0.050 | BK7 | 0.978 | 0.00 | 0.239 | −0.125 |
| 11 | Infinity | 0.100 | BK7 | 0.978 | 0.00 | | |
| 12 | Infinity | 4.183 | | 0.976 | 0.00 | | |
| IMA | Infinity | | | 0.801 | 0.00 | | |

The optical properties of the hybrid sol-gel material, e.g., the index of refraction, closely approximate those of Schott Glass crown glass BK7, as disclosed in the Schott Glass Catalog, Schott Glass Technologies Inc., Duryea, Pa. 18642. In Table 1, the hybrid sol-gel material lenslets are therefore modeled as though made from BK7 glass. The aspheric lenslet elements are patterned on a cover-glass substrate of 150 μm thickness. The optical properties of the cover glass substrate, e.g., the index of refraction, approximate those of crown glass BK7. In Table 1, the cover-glass substrates are therefore modeled as though made from BK7 glass.

As shown in FIG. 3, the single microscope is designed for imaging slides with a 170-μm thick cover-glass plate 14 and a 130-μm air gap between the cover plate 14 and the objective lens 12. The single microscope combines a conventional optical element, i.e., a plano-convex glass lens, as the objective lens 12 and three lithographic lens elements as the refractive plates 16 to achieve a near diffraction-limited performance without sacrificing simplicity and low cost. An optical system is diffraction-limited when the aberrations in the image have been reduced to a negligible level. In the context of imaging, the term diffraction-limited refers to the condition that the spatial resolution of the optical system is only limited fundamentally by the wave nature of light and not by any imperfections in the optical system design. Diffraction-limited performance is the best achievable performance in an optical system.

FIG. 4 shows the theoretical image-plane spot diameter for the microscope layout 15 shown in FIG. 3. The spot diagrams also shown in FIG. 4 indicate the effect of aberrations compared to the size of a so-called Airy disc. The size of the Airy disc is determined by diffraction and optical-system parameters such the numerical aperture NA and operating wavelength only. When spot diagrams are smaller than the Airy disc or comparable in size to the Airy disc, the associated optical system is diffraction limited or nearly diffraction limited, respectively. The diffraction limited spot diameter for the layout design in FIG. 3 is approximately 8 μm, as illustrated by the relative size of a diffraction-limited Airy disc. An image-plane spot diameter of 8 μm can be accommodated within the size of a single image-sensor 18 detector element assuming a detector element in the sensor 18 to be a 10 µm by 10 µm square detector element. Further, an 8 µm image-plane spot diameter corresponds to a 2 µm diameter spot on the microscope slide since the transverse magnification is m=−4. Considering possible alignment errors and scattering within the miniature microscope element, a point-to-point resolution of approximately 1.5 µm with the microscope design shown in FIG. 3 can be expected. While the numerical aperture of the microscope-objective optical design shown in FIG. 3 is targeted at a value of NA=0.4, according to one aspect of the present invention, the objective lens and a refractive plate define a dry imaging system with a numerical aperture within a range from NA=0.05 to NA<1.0. According to another aspect of the present invention, the objective lens and the refractive plate define an immersion imaging system with a numerical aperture within a range from NA=0.05 to NA=0.95n where n is the index of refraction of the immersion medium. These ranges are defined in practice by the index of refraction of the objective lens and refractive plate materials. While materials with conventional optical properties are utilized herein by way of examples, the present invention is not limited to the application of current materials but can also include materials with higher refractive indices which would extend the numerical aperture of the MA to higher values.

When a miniature microscope is designed to operate at multiple wavelengths, variation of the index of refraction with wavelength (i.e. dispersion) in the constituent optical elements must be accounted for. Failure to account for variations in the index of refraction leads to chromatic aberrations in which the performance of the optical system is different at different wavelengths, leading for example to a color-dependent blurring of the image. A solution to chromatic aberrations is to combine glasses of different dispersions (quantified for example by the Abbe number) in order to cause light of two different wavelengths to focus at the same image plane (e.g., an achromatic design) or to cause light at three different wavelengths to focus at the same image plane (e.g., an apochromatic design). When a wide variety of glasses with different dispersions is not available, chromatic aberrations can be reduced by using a corrective optical element with a diffractive surface. A diffractive surface is highly dispersive and, when correctly designed, can compensate for the inherent dispersion of a lens material such as for example a lens made with a hybrid sol-gel material using a sol-gel process. An optical design program such as for example ZEMAX® enables one to design diffractive elements and to introduce diffractive elements into a compound-lens design. The use of diffractive surfaces on camera lenses to correct chromatic aberrations is described by M. Schaub in U.S. Pat. No. 6,040,943, the entire contents of which are herein incorporated by reference.

The number of miniaturized microscopes needed to cover the entire width of a microscope slide depends on the ratio of microscope-slide width (e.g., a microscope slide width of 20 mm) to the FOV diameter of each microscope element. A smaller ratio requires fewer microscopes in the array. For the existing NA=0.4 design (as utilized in the single miniaturized element of FIG. 1A and the layout design of FIG. 3), the non-overlapping FOV for each microscope is 200 µm in diameter. As a result, in this example, approximately 100 miniature microscopes are needed to image a microscope slide with a width of 20 mm.

Figure 5B:
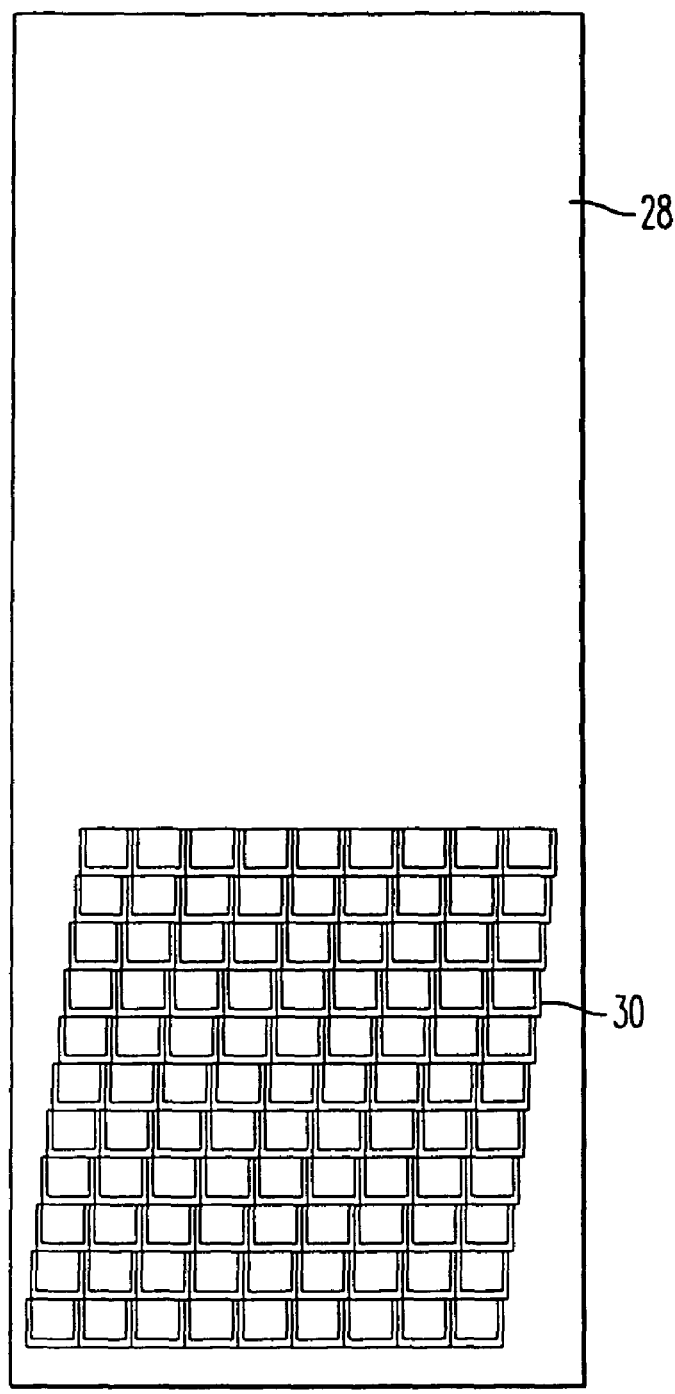
FIG. 5B is a top view of a MA with 99 microscopes.

The design depicted in FIG. 5A shows a completed MA array 30 with a spacing between adjacent microscopes of 1.78 mm. This spacing determines the number of microscopes that can be arranged across the width of the microscope slide. This spacing as compared to the FOV diameter determines the number of microscope rows needed to form a composite field of view which equals the microscope-slide width. Based on these considerations, the MA can be arranged as depicted in FIG. 5B in a rectangular fashion with staggered rows. An object on a standard 20 mm by 50 mm microscope slide area can be imaged, according to the present invention, by an array of 99 microscopes organized in 9 rows of 11 microscope in each row (see FIG. 5B). In such an arrangement, the overall size of the completed MA 30 is 7.25 mm high, 16.9 mm long (i.e., in the direction along the length of the microscope slide 28) and 23.1 mm wide (i.e. in the direction across the width of the microscope slide 28).

The MA 30, as shown in FIG. 5A, scans via a scan motor 33A longitudinally across the slide 28 imaging the object on the microscope slide 28. Alternatively, the scan 33A motor could move the slide 28 under a stationary MA. A light source 29 transilluminates or epi-illuminates the object on the slide. For transillumination, the object can be illuminated by means of an array of light emitting diodes (LEDs). A diffusing surface can be placed between the LEDs and the object to improve the uniformity of illumination and to fill the numerical aperture of the microscopes. The diffusing surface can be opal glass. For epi-illumination, light can be transmitted to the object by fiber optic guides or slab waveguides on the base plate 20 holding the objective lens 12.

FIG. 6 is a schematic depicting a composite layout of the fields of view for the 99 microscopes in the completed MA 30. Each field of view in FIG. 6 measures 250 µm in diameter and the horizontal spacing between adjacent fields of view is 1.78 mm. Scanning of the microscope slide beneath the MA results in a composite field of view across the entire width of the microscope slide.

Figures 7A, 7B:
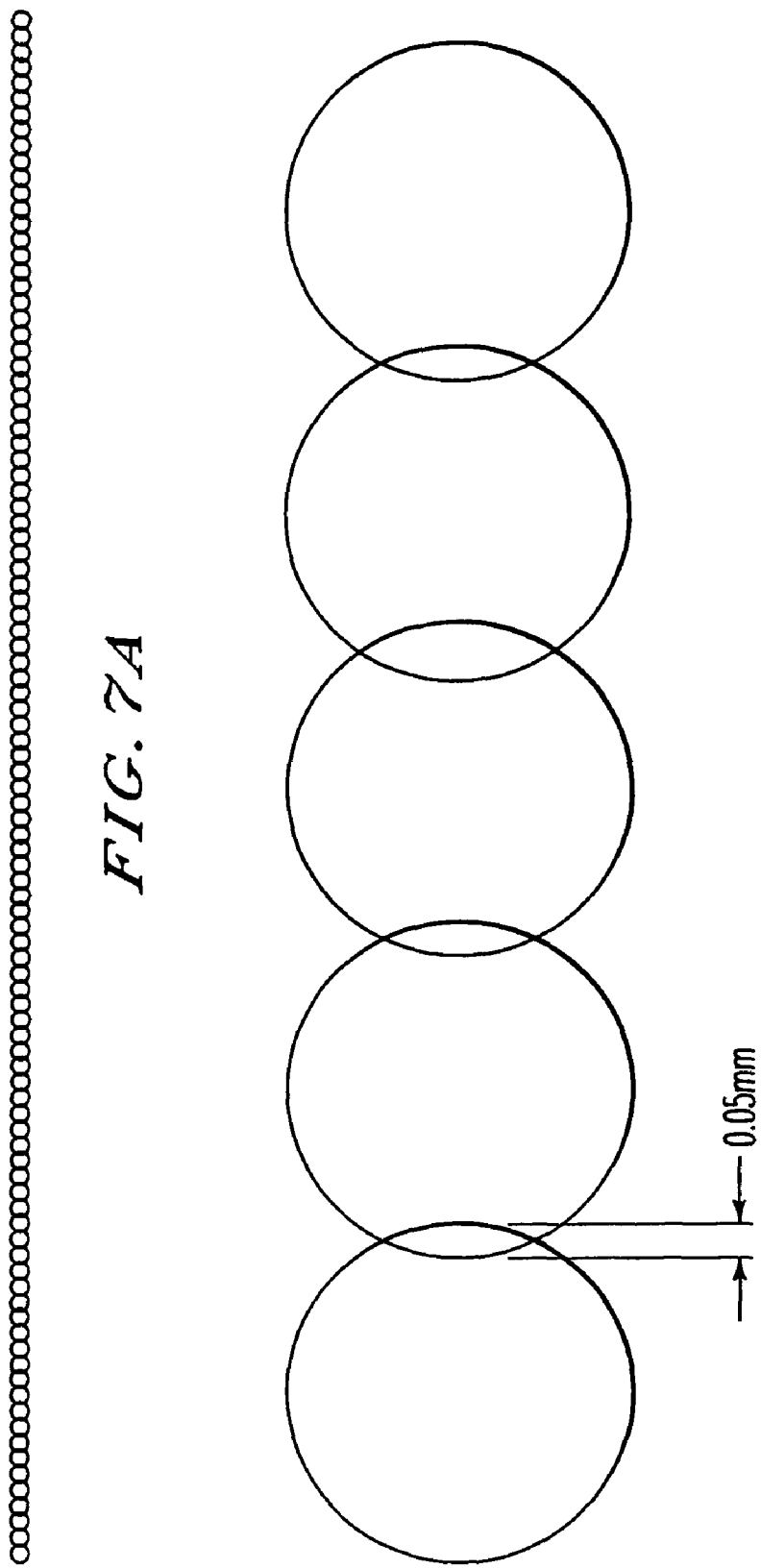
FIG. 7A is a schematic depicting a scanned section of the object.
FIG. 7B is a schematic depicting a magnified section of FIG. 7A.

FIG. 7A is a schematic depicting a composite section of the microscope slide across the width of the microscope slide (i.e. orthogonal to the scan direction). The composite section includes the complete set of individual microscopes' fields of view. FIG. 7B shows a magnified section of the composite section. The microscopes 10 in the array 30 are spaced horizontally so as to produce a 50 µm overlap between adjacent microscopes' fields of view. The overlap can be adjusted, according to the present invention, by changing the center-to-center spacing between microscopes on the same row. Thus, a computer 32 (i.e. a concatenating device) concatenates a composite image of the specimen by registering in memory where all the images have been taken relative to a starting position and registering which microscope element in the array acquired the image. Once the MA scans the entire object, then the individual digital images can be concatenated by realizing where on the object each picture in memory was derived. By assembling the registered images in an ordered matrix representative of the position at which the images were taken, a composite image is generated. The computer controls a scan motor 33A and a height-adjustment motor 33B to coordinate the scanning process and to focus on a desired depth within or height on the object, respectively.

Control of distortion in every image is important for accurate concatenation of the recorded images into a composite image. Control of field-independent spherical-aberration types and field-dependent comatic aberration types and astigmatic aberration types in the MA of the present invention is important to maintain high resolution across each recorded image. Field-dependent aberrations result for example in the center of an image being characterized by superior contrast than the periphery of the image. For concatenation of images along the row in FIG. 7B, field-dependent aberrations deteriorate the concatenated image quality. Further, any inaccuracies in spacing between optical axes of the array of microscopes may likewise deteriorate the composite image quality.

Figure 8:
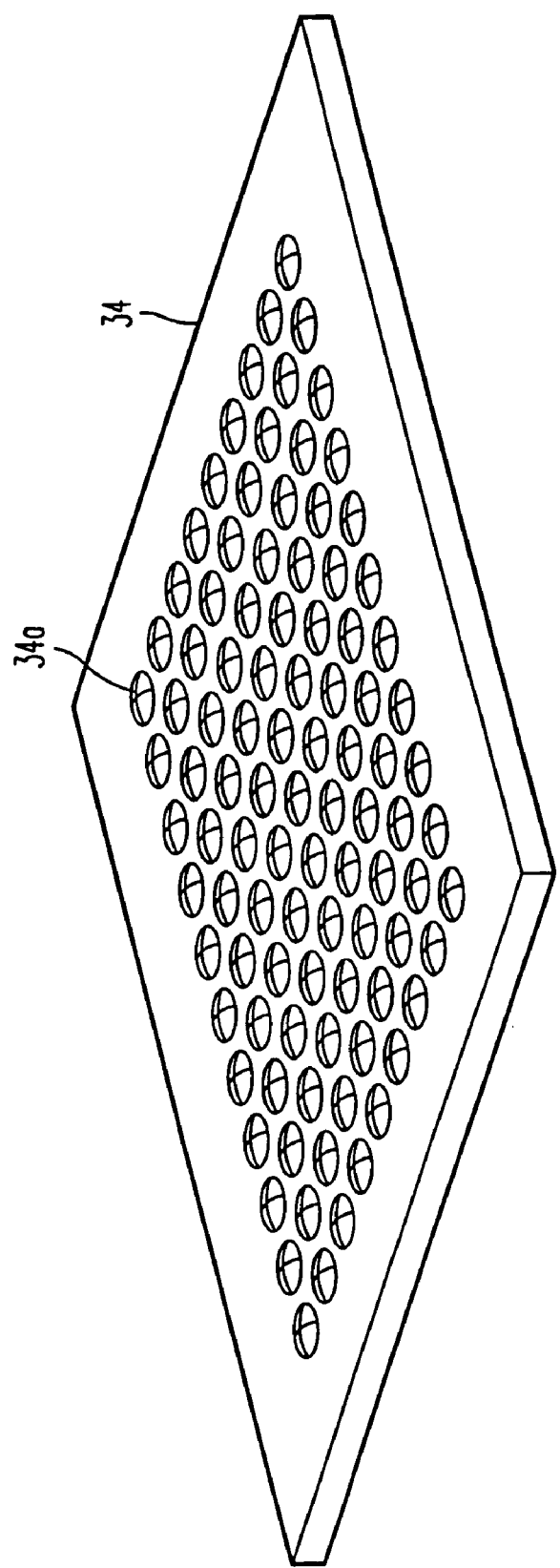
FIG. 8 is a schematic depiction of a refractive plate patterned with an array of lenslets.
Figure 9:
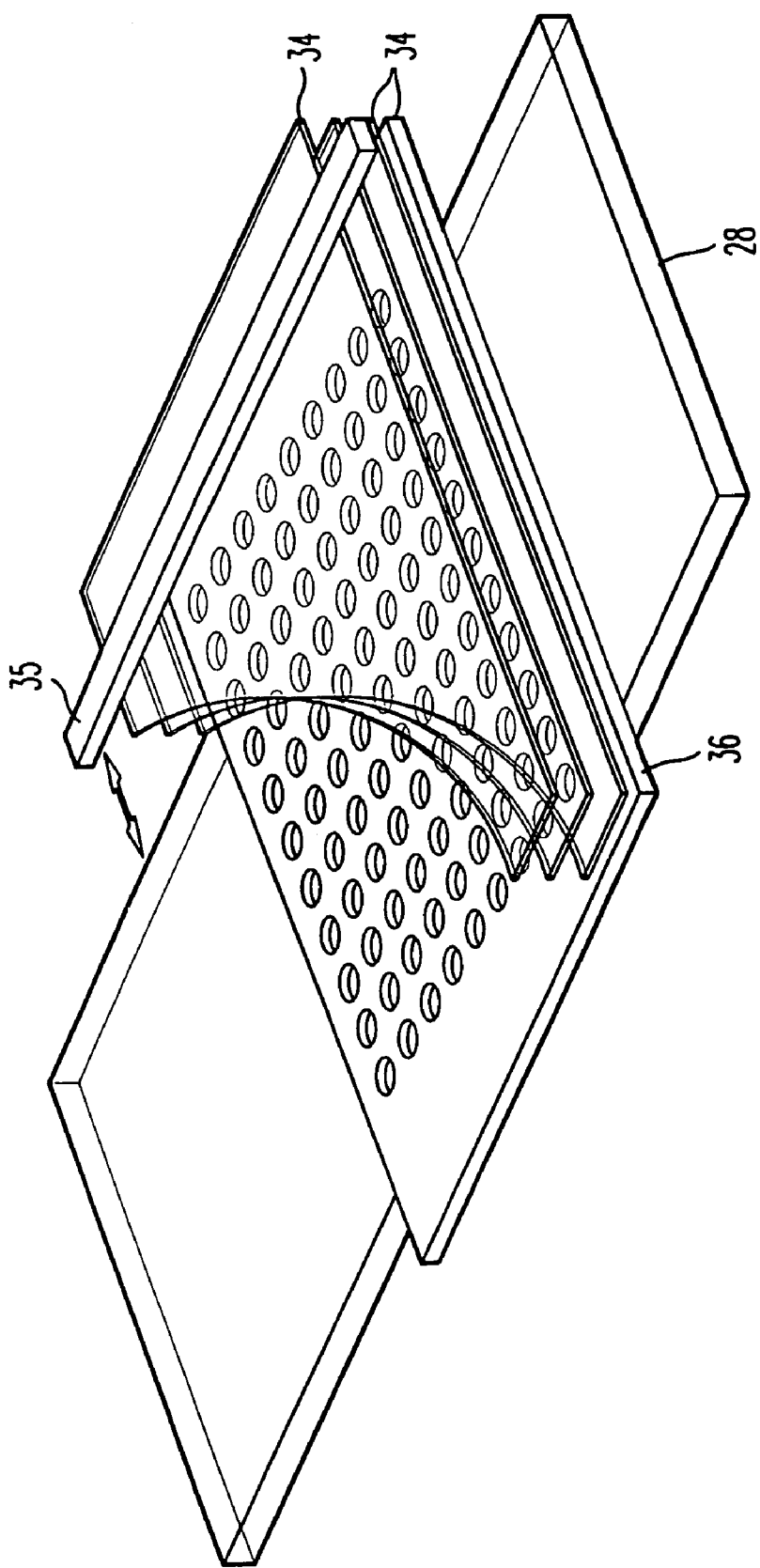
FIG. 9 is a schematic depiction of a composite base plate and three composite refractive lens plates.
Figure 17:
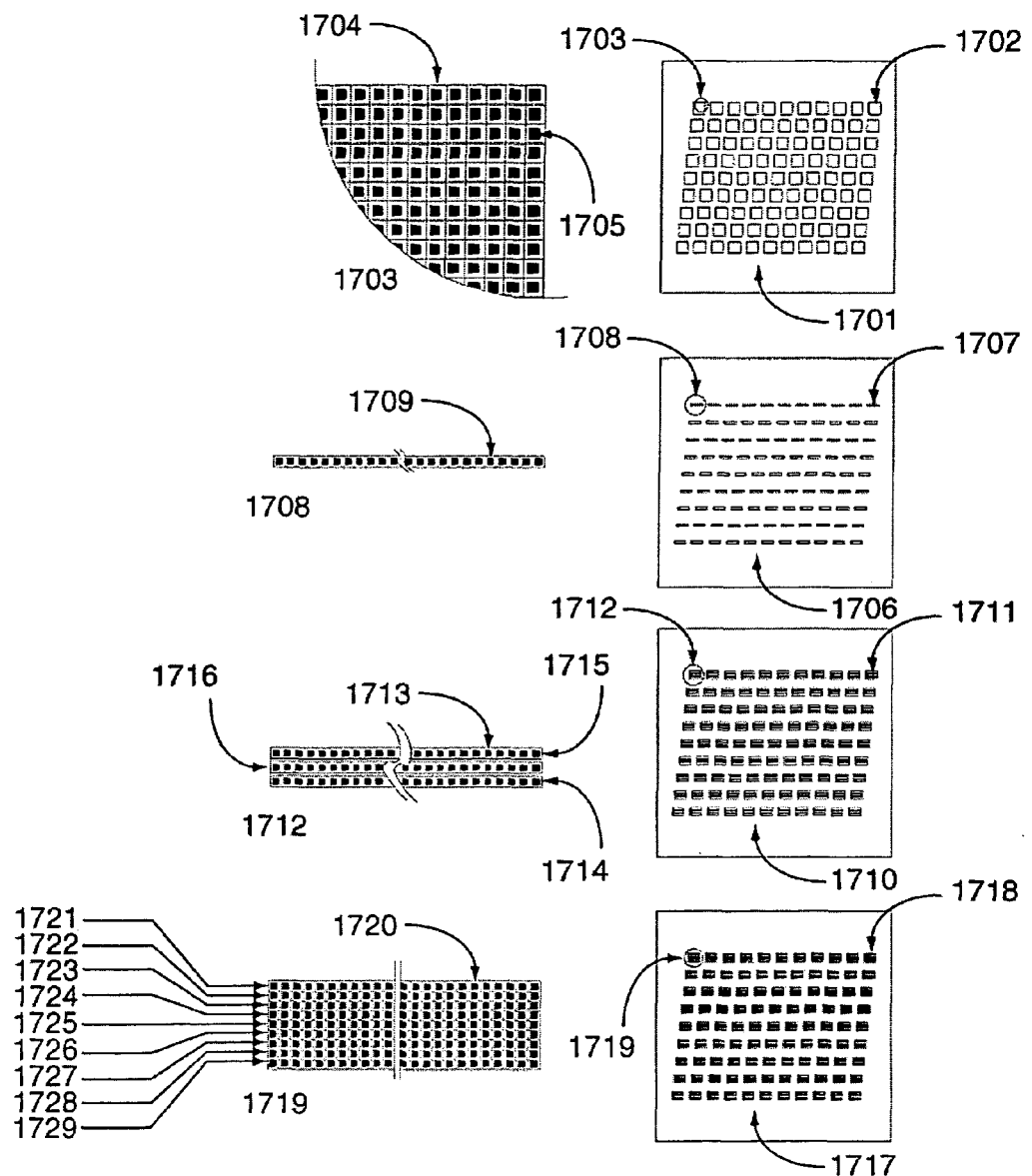
FIG. 17 is a schematic depiction of image-sensor formats that are compatible with the MA of the present invention and offer diverse image-acquisition modalities.

In a preferred embodiment of the present invention, the refractive plates 16 are fabricated as a composite refractive plate 34 as shown in FIG. 8 which includes an array of printed optical elements 34*a*. The refractive plates can be lithographically printed, embossed, molded, or laser-printed with the optical elements such as for example lenslets, aspherical lenses, diffractive components, cubic phase plates. Further, the composite refractive plates 34 are stacked above a composite base plate 36 as shown in FIG. 9. The composite base plate 36 includes an array of embedded optical elements, such as for example the plano-convex objective lenses 12 depicted in FIGS. 3 and 5. The stacked set as shown in FIG. 9 is aligned with the optical elements 35 and the objective lenses 12 directly above each other. Also shown in FIG. 9 as the image sensor is a linear photodetector array located in an image plane of the MA. Scanning of the MA across the sample forms line-by-line images of the object which are concatenated into a composite image of the object. The linear photodetector array 35 can include multiple linear photodetector arrays. FIG. 17 presents photodetector configurations that can each be used in the image plane of the MA. Image sensor 1701 includes a staggered array of two-dimensional (2D) photodetector arrays 1702. FIG. 17 shows a magnified segment 1703 of a 2D photodetector array 1702. Each 2D photodetector array 1702 includes a rectangular array of pixels 1704. Each pixel 1704 includes a photosensitive region 1705. Alternatively, image sensor 1706 includes a staggered array of one-dimensional (1D) photodetector arrays 1707. FIG. 17 shows a magnified view 1708 of a 1D photodetector array 1707. Each 1D photodetector array 1707 includes pixels. There may be, for example, 512 pixels in each 1D photodetector array 1707. Each pixel contains a photosensitive region 1709. Alternatively, image sensor 1710 includes a staggered array of groups of 1D linear photodetector arrays 1711. FIG. 17 shows a magnified view 1712 of a group of 1D linear photodetector arrays 1711. Each 1D photodetector array 1714, 1715, and 1716 includes pixels. Each pixel contains a photosensitive region 1713. In the case of image sensor 1710, the 1D photodetector arrays 1714, 1715, and 1716 may each be covered by a different spectral filter, e.g, 1714 is covered with a filter that transmits red (R) light, 1715 is covered with a filter that transmits green (G) light, and 1716 is covered with a filter that transmits blue (B) light, such that scanning of the MA across the sample forms line-by-line images of the object which are concatenated into a composite color, e.g, R-G-B, image of the object. The center wavelengths of the red filter covering 1714, the green filter 1715, and the blue filter covering 1716 may be 635 nm, 532 nm, and 430 nm, respectively. Other filter center wavelengths, filter spectral bandwidths, and filter configurations are possible. The 1D photodetector arrays 1714, 1715, and 1716 may also exhibit different pixel-to-pixel spacing. The choice of the pixel-to-pixel spacing associated with 1714, 1715, and 1716 is dictated by the choice of the spectral filter on each of these 1D photodetector arrays and a miniature microscope objective's lateral chromatic aberration (LCA) associated with each filter's center wavelength. By adjusting the pixel-to-pixel spacing associated with 1714, 1715, and 1716, variation with wavelength of transverse magnification may be minimized, reducing the need to process collected image data after the image data are detected by the image sensor. Alternatively, image sensor 1717 includes a staggered array of groups of 1D photodetector arrays 1718. FIG. 17 shows a magnified view 1719 of a group of 1D photodetector arrays 1718. In this configuration, the image of the object is swept over the group of 1D photodetector arrays 1718 in a direction perpendicular to the photodetector rows 1721, 1722, 1723, 1724, 1725, 1726, 1727, 1728, and 1729. The charge built up at each pixel is moved along each photodetector column at the same rate as the image. This method of reading out signal is known as time-delay-and-integration (TDI) mode. In the case of TDI, the noise variance and the charge grow linearly with the number of rows in the group of 1D photodetector arrays 1718. Consequently, the signal-to-noise (SNR) ratio is improved relative to a single 1D photodetector array by the square root of the number of rows in 1718. The effects of fixed pattern noise are also diminished by averaging over each photodetector column, similar to that described in G. H. Rieke, "Detection of Light: From the Ultraviolet to the Submillimeter", Ch. 7 (Cambridge University Press, 1994; ISBN: 0 521 57674 1) and R. G. Driggers, et al., "Introduction to Infrared and Electro-Optical Systems", Ch. 8 (Artech House, 1999; ISBN 0-89006-470-9), the entire contents of which are incorporated herein by reference.

Image sensor 1701 is well matched to the case in which the MA moves along a longitudinal direction of a glass slide, or vice versa, and stops momentarily and repeatedly to acquire two-dimensional images of portions of the object. Image sensors 1706, 1710, and 1717 are well matched to the case in which the MA moves along a longitudinal direction of a glass slide, or vice versa, without halting and at a constant velocity while the image sensors 1706, 1710, and 1717 record line-by-line images of the object.

Figure 18:
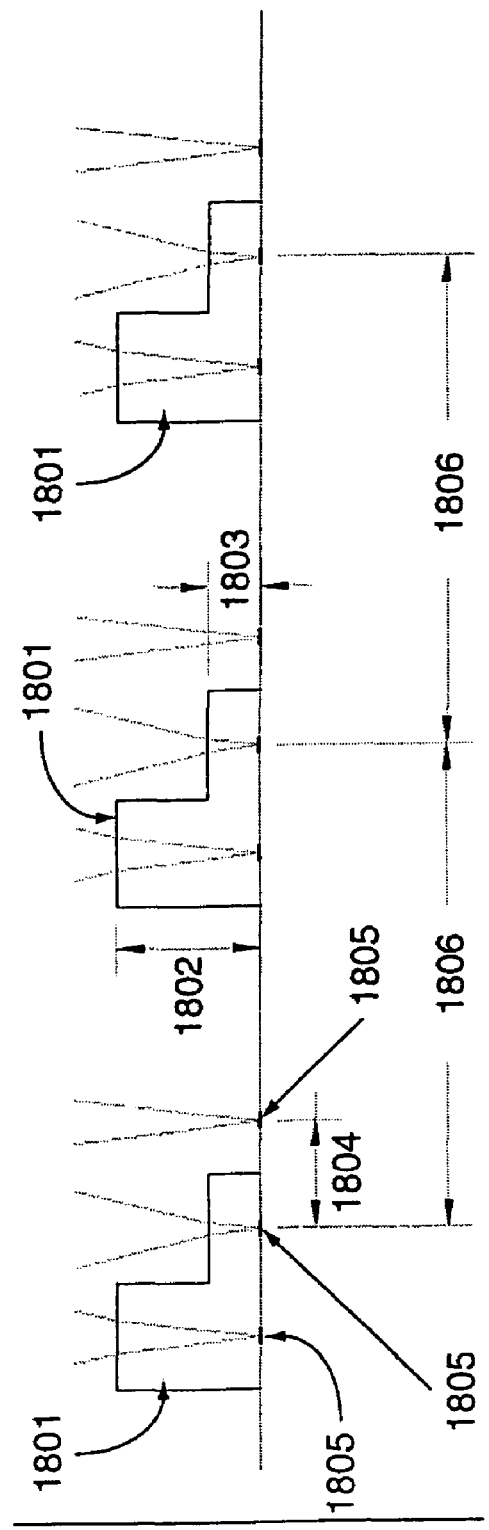
FIG. 18 is a schematic depiction of a side view of transparent strips of an optical material that can be used, according to the present invention, to allow simultaneous imaging with the MA of different depths within an object or heights on an object.

In another embodiment, the image sensor 1710 is configured in a staircase configuration, to permit simultaneous imaging of object features at different depths in the object or at different heights on the object. FIG. 18 shows the preferred embodiment of this method. In this case, an image sensor such as image sensor 1710 is covered with a mask that includes a plurality of transparent strips 1801 of an optical material. Each transparent strip is oriented parallel and coincident with a 1D photodetector array, e.g., 1805. The 1D photodetector arrays associated with each thickness 1802, 1803, or no thickness are separated by a spacing 1804. The spacing 1804 is bounded above by the requirement that each 1D photodetector array span the entire cross-scan width of the associated microscope objective's field of view. The spacing 1804 is bounded below by the need to avoid cross-talk between the images recorded at each of the 1D photodetector arrays 1805. That is, the light converging to form an image at any 1D photodetector array 1805 should pass entirely only through one thickness of the transparent strip. The thicknesses 1802 and 1803 of a strip 1801 are determined by the depths from which a focused image is to be formed on the corresponding 1D photodetector arrays 1805. The number of different transparent-strip 1801 thicknesses, e.g., 1802 and 1803, is determined by the number of depths within the object that are to be imaged simultaneously by an MA. For example, the configuration shown in FIG. 18 would allow simultaneous imaging of three different depths within the object. The image sensor 1717, when combined with an appropriate transparent-strip mask, could allow simultaneous imaging of up to nine different depths within the object.

In another preferred embodiment, a height adjustment motor 33B, shown in FIG. 5A, permits setting of the MA array 30 to different heights, providing a focusing effect and/or producing images at different focal planes of the object (i.e. of the specimen). Digitally, a reconstructed digital image can be produced via a computer 32. The computer utilizes processing techniques to produce the reconstructed digital image which are similar to those in Adler et al. (U.S. Pat. No., 6,023,495) and George et al. (U.S. Pat. No., 6,175,655), the entire contents of both patents are herein incorporated by reference.

In fabrication of the composite plates 34, the optical elements 35 are printed, according to the present invention, by lithographically printing, embossing, molding, or laser-printing. Printing of the optical elements 35 by lithography provides for accurate dimensioning of the array of optical elements on the plate 34. Printing of the optical elements 35 by laser printing also provides accurate dimensioning of the array of optical elements on the plate 34. Laser-printing in the present invention follows closely methods and techniques known in the field of laser printing such as for example techniques in Wyrowski and Turner, "Diffractive Optics for Industrial and Commercial Applications", John Wiley & Sons; ISBN: 3527401008, the entire contents of which are herein incorporated by reference.

Printing of the optical elements 35 of the present invention utilizes hybrid sol-gel materials (i.e. hybrid sol-gel glasses or hybrid glasses). Recent developments in hybrid sol-gel materials permit the formation and patterning of thicker optical elements as compared to non-hybrid sol-gel materials. The sol-gel process can be considered as a method for producing glass and ceramic materials from metallo-organic precursors by low temperature polymerization reactions. H. K. Schmidt in "Sol-gel and polymer photonic devices," SPIE Critical Review, vol. CR68, pp. 192–203, 1995, the entire contents of which are herein incorporated by reference, discloses sol gel processing as a tool for making diverse optical materials. Furthermore, M. R. Descour, et al., in "Toward the development of miniaturized imaging systems for detection of pre-cancer," IEEE Journal of Quantum Electronics, vol. 38, No. 2 (February 2002), the entire contents of which are herein incorporated by reference, disclose the sol-gel method as a tool for making micro-optical elements such as lenslets.

One obstacle for the application of sol-gel inorganic materials into many optical devices has been the maximum attainable crack-free sol-gel glass thickness. Increased thickness is a prerequisite for increasing the optical power of any lithographically fabricated optical element. Fabrication of components with thicknesses greater than 1 mm based on oxygen-metal-oxygen sol-gel materials (i.e. non-hybrid sol gels) normally requires iterative cycles of deposition, baking at temperatures around 1000° C., and dry etching. However, hybrid sol-gels have been recently developed which incorporate an organic groupings and reduce the connectivity of the sol-gel network, allowing thicker sol gel film deposition as compared to sol-gels which do not include the organic groupings. See for example U.S. Pat. No. 5,871,558 and U.S. Pat. No. 6,150,653, the entire contents of which are incorporated herein by reference.

In the sol-gel technique of the present invention, optical elements on a refractive plate 16 or a composite refractive plate 34 are defined using ultraviolet (UV) light in a single lithography step. The sol-gel process disclosed by Assadi et al. in U.S. Pat. No. 6,150,653 and Rantala et al. in "Direct patterning of thick hybrid glass film for micro-opto-mechanical structures," Electronics Letters, vol. 36, pp. 1–2, (2000), the entire contents of both references are incorporated herein by reference, are similar the process of the present invention. In one lithography step and using a grayscale photomask, a thick layer of hybrid sol-gel material is patterned with a diffractive, a reflective, or a refractive optical surface, or a combination thereof. In grayscale lithography, a spherical optical surface is as simple to fabricate as an arbitrary aspheric optical surface. To make a convex refractive lens, for instance, the hybrid sol-gel material will be spin-coated to form a 100 μm thick film on borosilicate glass substrates. After spinning, the films will be prebaked at 95° C. for 10 minutes to decrease the amount of solvents in the film. The baking step reduces the effect of photomask adhesion to the film and also improves the adhesion of the film to the glass substrate. Ultraviolet (UV) exposure can be accomplished by using a mercury UV lamp at a wavelength of 365 nm and a grayscale photomask.

The grayscale photomask is designed to impart to the film an arbitrary surface, subject only to the 100 μm limitation on the maximum depth. Lithographically fabricated optical elements can be characterized interferometrically to measure the accuracy of the surface figure and to determine the surface roughness. The accuracy of the surface figure determines the optical elements' first-order properties, e.g., the focal length, and the aberrations introduced by the optical elements. The surface roughness determines the fraction of light that is scattered by the optical elements, leading to reduced throughput and reduced contrast due to stray light. The scattering properties of the patterned hybrid sol-gel material can be further characterized in terms of a bi-directional scattering distribution function (BSDF). The BSDF determines the angular distribution of scattered light. The BSDF data can be used to increase the accuracy of modeling of the miniature microscopes and to improve the designs by controlling stray light. No etching of the patterned surface is necessary to create the optical structures of the present invention, thereby eliminating an expensive and time-consuming fabrication step. Alternatively, the optical elements 35 and the composite refractive plate 34 shown in FIG. 8 can be fabricated, according to the present invention, by molding or embossing.

Embossing techniques similar to those techniques disclosed by Choquette et al. in U.S. Pat. No. 5,861,113, the entire contents of which are incorporated herein by reference, are suitable for the present invention. Molding techniques similar to those techniques disclosed by Yoshida et al. in U.S. Pat. No. 6,105,395 or by Nomura et al. in U.S. Pat. No. 5,976,425, the entire contents of both patents are incorporated herein by reference, are suitable for the present invention. In the lithographic and embossing techniques of the present invention, the composite refractive plate 34 or the composite base plate 36, as shown in FIG. 9 is embossed or lithographically printed at the grid positions of each microscope element with an appropriate optical element such as for example an objective lens or aspherical corrector. In the molding technique according to the present invention, a mold produces a composite refractive plate with the appropriate optical elements molded at the proper grid positions. In any of the lithographic, embossing, and molding techniques, the relative positions of the appropriate optical elements, according to the present invention, are controlled with a sub-micron accuracy. As shown in FIG. 9, alignment of the stacked plates relative to each other defines the alignment of all the microscopes in the array. The materials of the composite refractive plate 34 or the composite base plate 36 can include silicon, glass, and polymers such as for example poly(methylmethacrylate) (PMMA).

Figure 10:
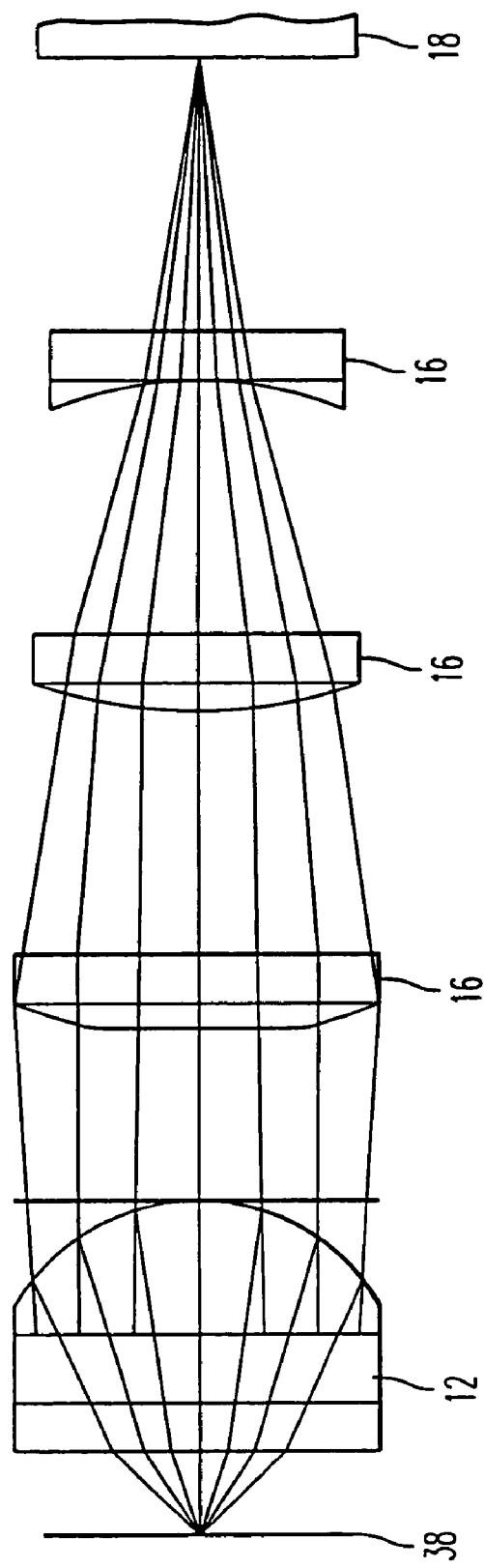
FIG. 10 is a schematic depiction of a high numerical aperture microscope objective.

In another embodiment of the present invention, a high-numerical-aperture miniaturized microscope is utilized in the MA of the present invention. A high-numerical aperture is required for applications that require high-spatial resolution imaging. Performance of the MA of the present invention is enhanced by the use of a high-numerical-aperture, dry miniature microscope objective. FIG. 10 shows a design of a NA=0.75 miniature microscope objective. The optical design of the NA=0.75 miniature microscope objective is disclosed in Table 2.

Figure 13:
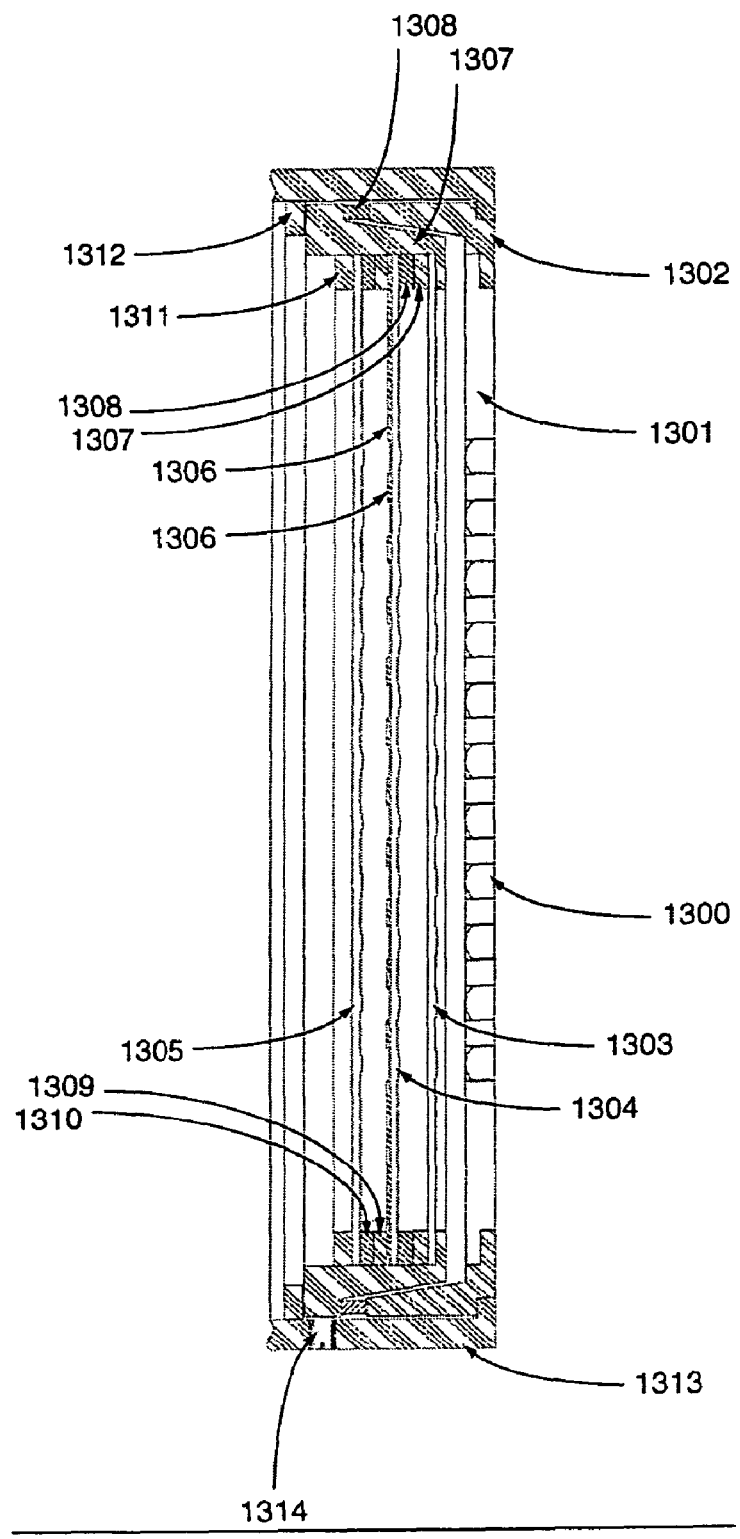
FIG. 13 is a schematic depiction of a mount design for an MA of the present invention including a composite base plate and three composite refractive lens plates.
Figure 14:
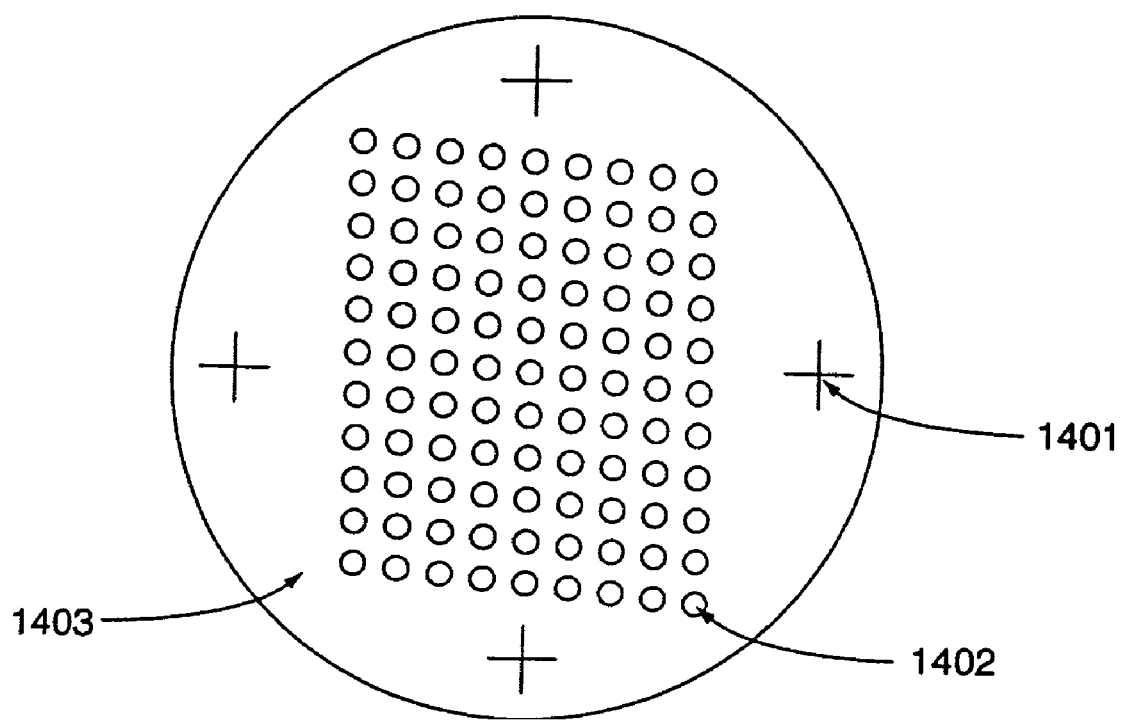
FIG. 14 is a schematic depiction of a composite refractive plate patterned with an array of lenslets as would be stacked according to the schematic depiction in FIG. 13.

The NA=0.75 miniature microscope objective has a field of view of 250 µm in diameter, identical to the miniature microscope objective shown in FIG. 3. A working distance, measured from the top surface of a cover glass covering the object 38 to the front surface of the objective lens 12, is 80 µm. The microscope objective depicted in FIG. 10 operates at a 4× magnification (i.e., transverse magnification m=−4). The distance from the object plane to the image plane is 5.3 mm. The NA=0.75 miniature microscope objective shown in FIG. 10 is designed for operation at a wavelength of 665 nm. Extension of the MA to operation at other wavelengths is accommodated by adjusting the optical-design parameters for the index of refraction of the objective lens 12 and the remaining optical elements 16 in FIG. 10 for the desired wavelength of operation. If the high-numerical-aperture MA of the present invention is to be used at different wavelengths, then the optical-design parameters can be varied in an optical design program, such as for example ZEMAX®, to yield the best, diffraction-limited performance.

approximate those of the Schott crown glass BK7. In Table 2, the hybrid sol-gel material lenslets are therefore modeled as though made from BK7 glass. The aspheric lens elements are patterned on a glass substrate of 150 µm thickness. The optical properties of the glass substrate, e.g., the index of refraction, approximate those of crown glass BK7, as disclosed in the Schott Glass Catalog. In Table 2, the glass substrates are therefore modeled as though made from BK7 glass. The MA can be assembled similarly to a conventional microscope objective. J. R. Benford, in "Microscope Objectives," Ch. 4 in Applied Optics and Optical Engineering, vol. III, ed. R. Kingslake (Academic Press, 1965), the entire contents of which are herein incorporated by reference, discloses such an assembly procedure. FIG. 13 shows the cross-section of a mount design compatible with the MA. The composite base plate 1301 is encased in a cell mount 1302. Mounted within the composite base plate 1301 is an array of plano-convex glass objective lenses 1300. The objective lenses 1300 are mounted in circular apertures etched in the composite base plate 1301. The objective lenses 1300 are held in place in the base plate 1301 using UV-cured optical cement. All composite plates are circular in shape as shown in FIG. 14. Each composite refractive plate 1403 is patterned with a staggered array of lenslets 1402 and alignment features 1401. The schematic depiction in FIG. 14 also applies to the composite base plate. In that

TABLE 2

Optical design of the NA = 0.75 miniature microscope objective shown in FIG. 10.
The optical design was prepared in ZEMAX ® optical-design software.

| Surface | Radius of Curvature (mm) | Thickness (mm) | Glass Type | Diameter (mm) | Conic Constant | 4th order $(mm^{-3})$ | 6th order $(mm^{-5})$ | 8th order $(mm^{-7})$ |
|---|---|---|---|---|---|---|---|---|
| OBJ | Infinity | 0.170 | BK7 | 0.25 | 0.00 | | | |
| 1 | Infinity | 0.080 | | 1.00 | 0.00 | | | |
| 2 | Infinity | 0.837 | SF57 | 1.20 | 0.00 | | | |
| 3 | −0.543 | 0.553 | | 1.20 | −1.04 | | | |
| 4 | −10.026 | 0.100 | BK7 | 1.22 | 0.00 | 1.352 | −1.824 | 1.237 |
| STO | Infinity | 0.150 | BK7 | 1.22 | 0.00 | | | |
| 6 | Infinity | 0.800 | | 1.21 | 0.00 | | | |
| 7 | 0.96 | 0.100 | BK7 | 1.14 | −0.70 | −0.652 | 0.944 | −4.054 |
| 8 | Infinity | 0.150 | BK7 | 1.14 | 0.00 | | | |
| 9 | Infinity | 0.800 | | 1.15 | 0.00 | | | |
| 10 | −2.318 | 0.010 | BK7 | 1.22 | 0.00 | 0.410 | 0.875 | −1.203 |
| 11 | Infinity | 0.150 | BK7 | 1.22 | 0.00 | | | |
| 12 | Infinity | 1.404 | | 1.20 | 0.00 | | | |
| IMA | Infinity | | | 0.98 | 0.00 | | | |

Figure 15:
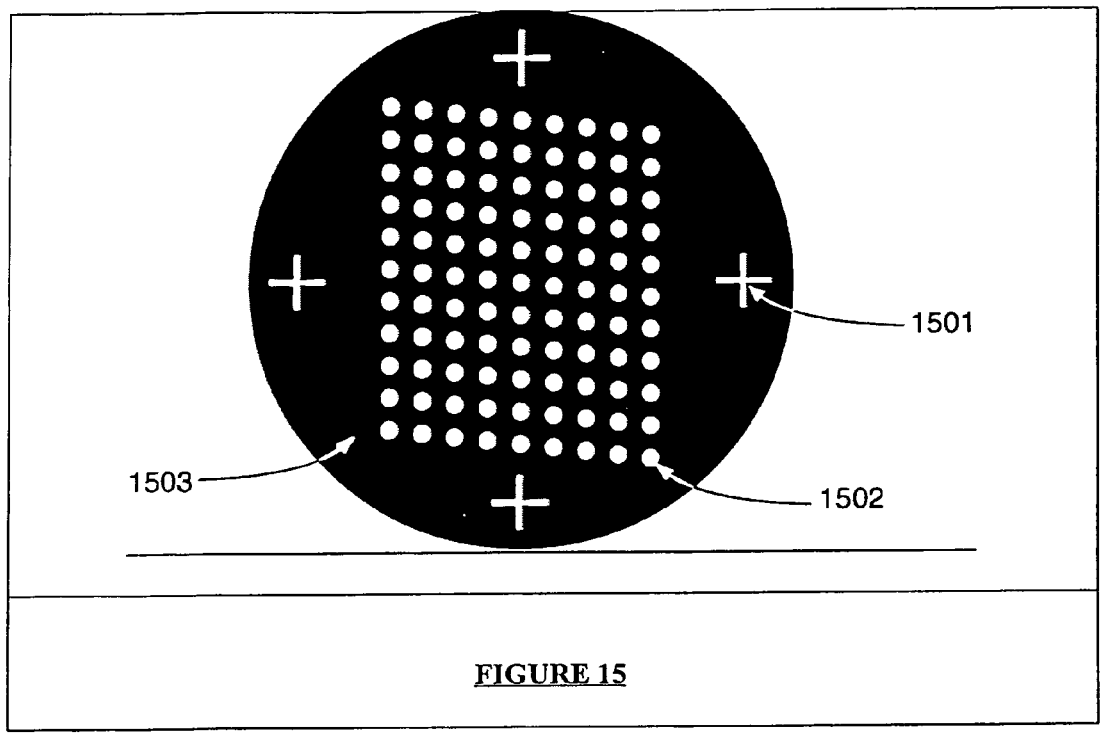
FIG. 15 is a schematic depiction of an aperture stop array as would be stacked according to the schematic depiction in FIG. 13.

In the high-numerical-aperture MA embodiment of the present invention, a objective lens element 12 is a plano-aspheric lens. The objective lens is followed by three highly aspheric lens elements 16. In this embodiment, the objective lenses 12 (e.g. a plano-convex optical element) are mounted in a composite base plate 36. The composite base plate includes circular apertures sized to hold the objective lenses 12. The objective lenses 12 are mounted in the composite base plate 36 and fixed in place using UV-cured optical cement. The three aspheric lens elements 16 are fabricated as arrays on stacked plates such as these stacked plates 34 shown in FIGS. 8 and 9. The maximum thickness of the patterned hybrid sol-gel material for each aspheric lens element is 100 µm. The optical properties of the hybrid sol-gel material, e.g., the index of refraction, closely case, the composite base plate holds a staggered array of plano-convex objective lenses 1402. The composite base plate is also marked with alignment features 1401. The composite base plate is fixed in the cell mount using an adhesive. The composite refractive plates 1303, 1304, and 1305 are mounted in a common cell. The distance between composite refractive plates 1303 and 1304 is adjusted using a spacer 1307 and a threaded retaining ring 1308. The distance between composite refractive plates 1304 and 1305 is adjusted using an opaque plate with stop apertures 1306, a spacer 1309 and a threaded retaining ring 1310. The opaque plate with stop apertures 1306 is shown in FIG. 15. The circular stop-aperture plate 1503 is opaque everywhere except within an array of stop apertures 1502 and except within alignment features 1501. Where opaque, the stop-aperture plate 1503 is preferably coated with an opaque coating such as flat black paint or is anodized. The stop-aperture plate 1503 can be made in a thin sheet of aluminum or another opaque material. The thickness of the stop aperture plate 1503 should be minimized. The circular apertures 1502 and the alignment features 1501 can be formed by laser cutting. Threaded retaining ring 1311 is used to hold lens plate 1305 in position. The cell 1302 and the cell 1307 are mounted inside a sleeve 1313. The distance between cell 1302 and cell 1307 is adjusted using a ring-shaped spacer 1308. Cell 1307 can be translated laterally relative to cell 1302 by means of centering screws 1314 threaded into the sleeve 1313. Three centering screws 1314 distributed in equal angular increments around the perimeter of the sleeve 1313 may be used.

Using the alignment features 1401 on composite refractive plates 1303, 1304, and 1305, and alignment features 1501 on the stop-aperture plate 1306, the lenslets 1402 on each of these plates and the stop apertures 1502 can be aligned by rotation within the cell 1307. The cell 1307 can be aligned relative to the composite base plate 1301 by rotation within the sleeve 1313. Adjusting the spacing between the composite base plate 1301 and composite refractive plates 1303, 1304, and 1305 during assembly by changing the thickness of spacers 1307, 1308, and 1309 can be used to control spherical aberration in each miniature microscope in the MA. Adjusting the lateral position of cell 1307 relative to cell 1302 by means of set screws 1314 can be used to control coma in each miniature microscope in the MA.

Alignment of the miniature objectives can be tested according to methods such as the star test described by J. R. Benford (see reference above), as will be understood by a person of ordinary skill in the art. The star test can be used to determine whether optimal spacers 1307, 1308, and 1309 have been selected to minimize spherical aberration. The star test can be used also to determine whether the composite refractive plates 1303, 1304, and 1305 have been optimally translated relative to the composite base plate 1301 to minimize coma. Other methods for evaluating and improving the alignment of the MA optics are disclosed by D. Malacara in "Optical Shop Testing", $2^{nd}$ Edition (Wiley, 1992), the entire contents of which are incorporated herein by reference.

Other methods of positioning the composite base plate 1301 relative to the composite refractive plate 1303 relative to the composite refractive plate 1304 relative to the composite refractive plate 1305 are possible.

The high-numerical aperture design shown in FIG. 10 can, according to the present invention, be altered by modifying the objective lens 12. As an alternative to the plano-convex shape of the objective lens 12 shown in FIG. 12, the objective lens 12 may be of a concave-convex shape or a convex-convex shape. Table 3 discloses an optical design for a NA=0.75 miniature microscope objective design in which the objective lens 12 is of a concave-convex shape. Table 4 discloses an optical design for a NA=0.75 miniature microscope objective design in which the objective lens 12 is of a biconvex shape.

TABLE 3

| Surface | Radius of Curvature (mm) | Thickness (mm) | Glass Type | Diameter (mm) | Conic Constant | 4th order $(mm^{-3})$ | 6th order $(mm^{-5})$ | 8th order $(mm^{-7})$ |
| --- | --- | --- | --- | --- | --- | --- | --- | --- |
| OBJ | Infinity | 0.170 | BK7 | 0.25 | 0.00 | | | |
| 1 | Infinity | 0.080 | | 1.00 | 0.00 | | | |
| 2 | −50 | 0.843 | SF57 | 1.20 | 0.00 | | | |
| 3 | −0.543 | 0.553 | | 1.20 | −1.04 | | | |
| 4 | −10.026 | 0.100 | BK7 | 1.22 | 0.00 | 1.352 | −1.824 | 1.237 |
| STO | Infinity | 0.150 | BK7 | 1.22 | 0.00 | | | |
| 6 | Infinity | 0.800 | | 1.21 | 0.00 | | | |
| 7 | 0.96 | 0.100 | BK7 | 1.14 | −0.70 | −0.652 | 0.944 | −4.054 |
| 8 | Infinity | 0.150 | BK7 | 1.14 | 0.00 | | | |
| 9 | Infinity | 0.800 | | 1.15 | 0.00 | | | |
| 10 | −2.318 | 0.010 | BK7 | 1.22 | 0.00 | 0.410 | 0.875 | −1.203 |
| 11 | Infinity | 0.150 | BK7 | 1.22 | 0.00 | | | |
| 12 | Infinity | 1.364 | | 1.20 | 0.00 | | | |
| IMA | Infinity | | | 0.98 | 0.00 | | | |

TABLE 4

| Surface | Radius of Curvature (mm) | Thickness (mm) | Glass Type | Diameter (mm) | Conic Constant | 4th order $(mm^{-3})$ | 6th order $(mm^{-5})$ | 8th order $(mm^{-7})$ |
| --- | --- | --- | --- | --- | --- | --- | --- | --- |
| OBJ | Infinity | 0.170 | BK7 | 0.25 | 0.00 | | | |
| 1 | Infinity | 0.080 | | 1.00 | 0.00 | | | |
| 2 | 25 | 0.849 | SF57 | 1.20 | 0.00 | | | |
| 3 | −0.547 | 0.553 | | 1.20 | −1.04 | | | |
| 4 | −10.026 | 0.100 | BK7 | 1.22 | 0.00 | 1.352 | −1.824 | 1.237 |
| STO | Infinity | 0.150 | BK7 | 1.22 | 0.00 | | | |
| 6 | Infinity | 0.800 | | 1.21 | 0.00 | | | |
| 7 | 0.96 | 0.100 | BK7 | 1.14 | −0.70 | −0.652 | 0.944 | −4.054 |
| 8 | Infinity | 0.150 | BK7 | 1.14 | 0.00 | | | |
| 9 | Infinity | 0.800 | | 1.15 | 0.00 | | | |
| 10 | −2.318 | 0.010 | BK7 | 1.22 | 0.00 | 0.41 | 0.875 | −1.203 |
| 11 | Infinity | 0.150 | BK7 | 1.22 | 0.00 | | | |
| 12 | Infinity | 1.382 | | 1.20 | 0.00 | | | |
| IMA | Infinity | | | 0.98 | 0.00 | | | |

The numerical aperture of the MA optical designs can be increased beyond NA=0.75. As is well understood in the art, increasing NA further can be achieved through modifying in an optical-design program, such as ZEMAX®, system parameters including optical surfaces as determined for example by the radius of curvature, the conic constant and aspheric coefficients, thicknesses of optical elements, the separations between optical elements, the image distance, optical-elements materials, and the number of optical elements. The maximum achievable numerical aperture will be also determined by manufacturing and assembly tolerances. However, for a dry microscope objective design the numerical aperture is limited to NA<1.0.

For immersion microscope objectives, the numerical aperture cannot exceed the index-of-refraction of the immersion medium. As is well understood in the art, large-NA immersion microscope objectives can be designed in an optical-design program such as ZEMAX® by filling the space between the cover glass and the front lens of the microscope objective with the immersion medium and modifying system parameters including surface figure of optical surfaces as determined for example by the radius of curvature, the conic constant and aspheric coefficients, thicknesses of optical elements, the separations between optical elements, the image distance, the optical-element materials, and the number of optical elements. The maximum achievable numerical aperture will be also determined by manufacturing and assembly tolerances.

Further, auto-focus techniques can be utilized in the MA of the present invention. In conventional microscopes, focus techniques have relied on motion of an entire lens relative to the object under inspection or motion of a lens element within a compound lens. In the context of the MA of the present invention, auto-focusing could utilize a refractive plate 16 made from a material with an electrically controllable index of refraction such as for example liquid-crystal (LC) or photorefractive materials. The degree of defocus could be determined directly from the imaged. U.S. Pat. No. 6,341,180, the entire contents of which are incorporated herein by reference, is an example of an image-based autofocus technique applicable to the present invention.

Figure 20:
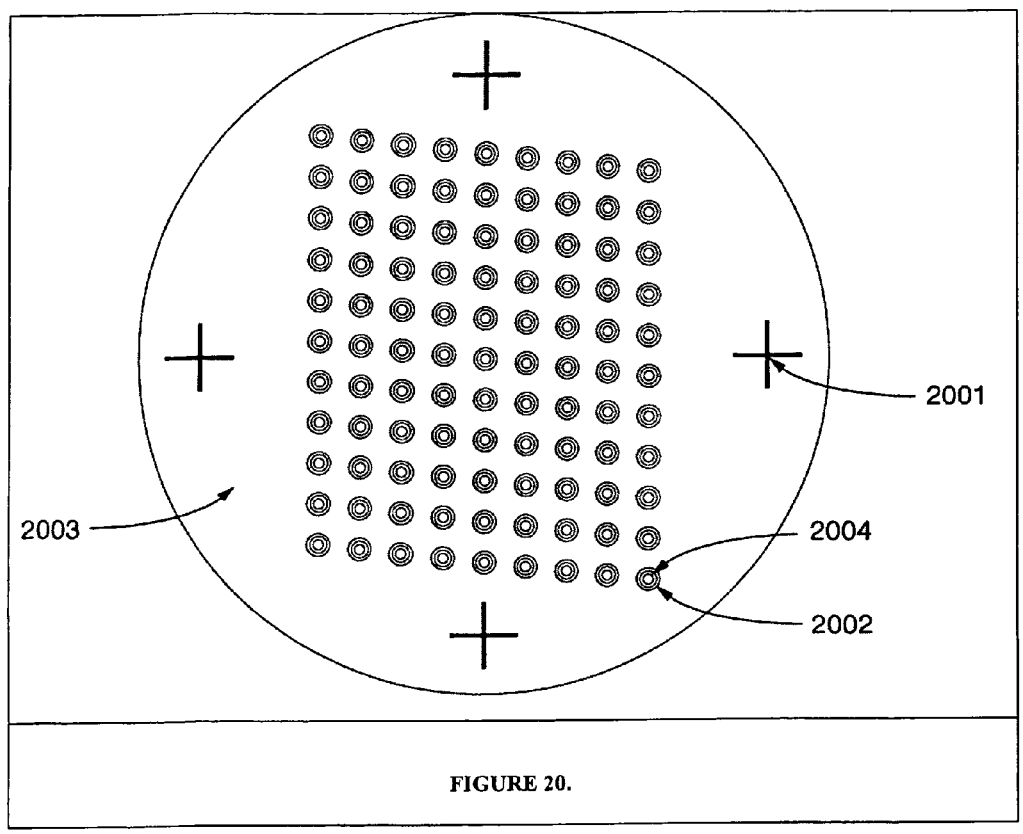
FIG. 20 is a schematic depiction of a composite refractive plate of the present invention.

FIG. 20 shows a composite refractive plate 2003 that includes an array of electrically controllable refractive elements 2002. The fabrication of such electrically controllable refractive elements 2002 using liquid-crystal materials is described by D. W. Berreman in U.S. Pat. No. 4,190,330 or E. Tajima in U.S. Pat. No. 6,191,881. By using circular, transparent electrodes 2004 as schematically depicted in FIG. 20, a positive or a negative refractive element can be enabled by the application of an electric or a magnetic field across the composite refractive plate. By applying an electric field across the refractive plate, the optical properties of all refractive elements 2002 may be changed in the same manner. Alternatively, by regulating the electric field applied to each refractive element 2002 and the associated electrodes 2004, each microscope objective can be individually focused independently of the focus setting of all other microscope objectives in the array. The composite refractive plate 2003 can be used to replace the composite refractive plate 1304 during assembly of the MA and aligned with the remaining composite plates using alignment features 2001. Using the NA=0.4 microscope objective design of Table 1 as an example, each electrically controllable refractive element 2002 should be adjusted to have an effective focal length of $f_e$=−152 mm in order for each microscope objective in the array to form an in-focus image of a depth within the object of 10 μm beneath the cover glass. Furthermore, using the NA=0.4 microscope objective design of Table 1 as an example, each electrically controllable refractive element 2002 should be adjusted to have an effective focal length of $f_e$=−76 mm in order for each microscope objective in the array to form an in-focus image of a depth within the object of 20 μm beneath the cover glass. In order to focus on other depths within the object beneath the cover glass, each electrically controllable refractive element 2002 should be adjusted to an effective focal length as may be determined by using an optical-design program such as ZEMAX® and by applying the appropriate voltage to each circular, transparent zone 2004.

Alternatively, the degree of defocus could be determined by a separate optical system that implements, for example, the astigmatic method described by M. Mansuripur in "The Physical Principles of Magneto-Optical Recording", Ch. 8, Section 3, pp. 264–277 (Cambridge University Press, 1995), the entire contents of which are herein incorporated by reference, or a ring-toric-lens method described by M. R. Descour, et al., in "A ring-toric lens for focus-error sensing in optical data storage," Applied Optics, vol. 38, No. 8, pp. 1388–1392 (Mar. 10, 1999), the entire contents of which are herein incorporated by reference. A correction signal based on the imaged data or derived from the separate optical system(s) could be applied to electrically control the index of refraction to maintain the best focus.

Figure 16:
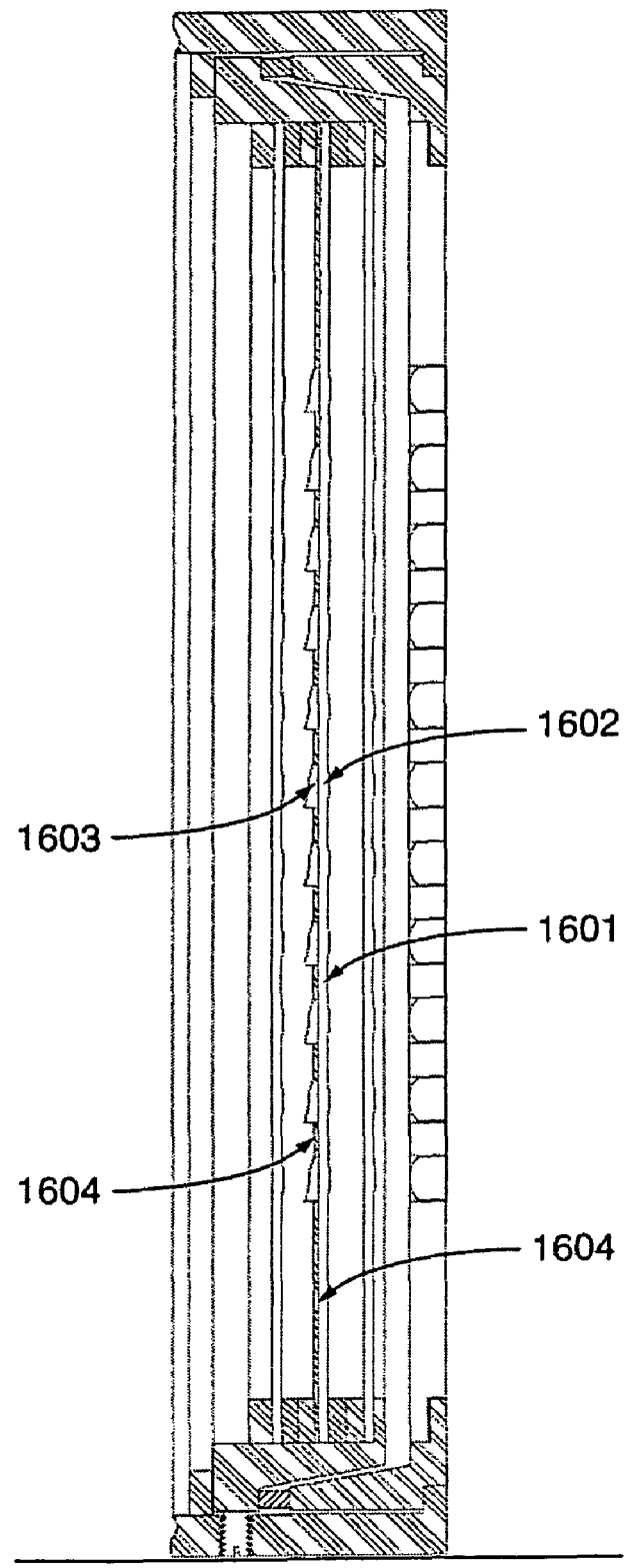
FIG. 16 is a schematic depiction of a side view of an MA of the present invention that incorporates an array of cubic-phase plates.

Additionally, according to the present invention, a composite refractive plate 34 could include an array of cubic-phase-plate optical elements. FIG. 16 shows a schematic depiction of such an MA embodiment. The composite refractive plate 1601 is patterned on one side with an array of convex aspheric lenslets 1602. On the other side, the refractive plate 1601 is patterned with an array of cubic phase plates 1603. In this embodiment, the cubic phase plates 1603 are co-located with the stop apertures 1604 and as depicted in FIG. 15. A cubic phase plate optical element is a device that enables the extension of an optical system's depth of field. In the present invention, the composite refractive plate including the cubic-phase-plate optical elements causes a blur within each miniature microscope that is independent of an object's axial position. However, the images recorded by the computer 32 would process the digital data to remove the position-independent blur. As a result of the computer processing, an image from an object having a highly contoured surface or a thick object will appear everywhere in focus. Such techniques utilizing a cubic phase plate device and methods for processing the data so obtained are disclosed in U.S. Pat. Nos. 5,748,371, 6,069,738, and 6,201,899, the entire contents of which are incorporated herein by reference.

Figure 19:
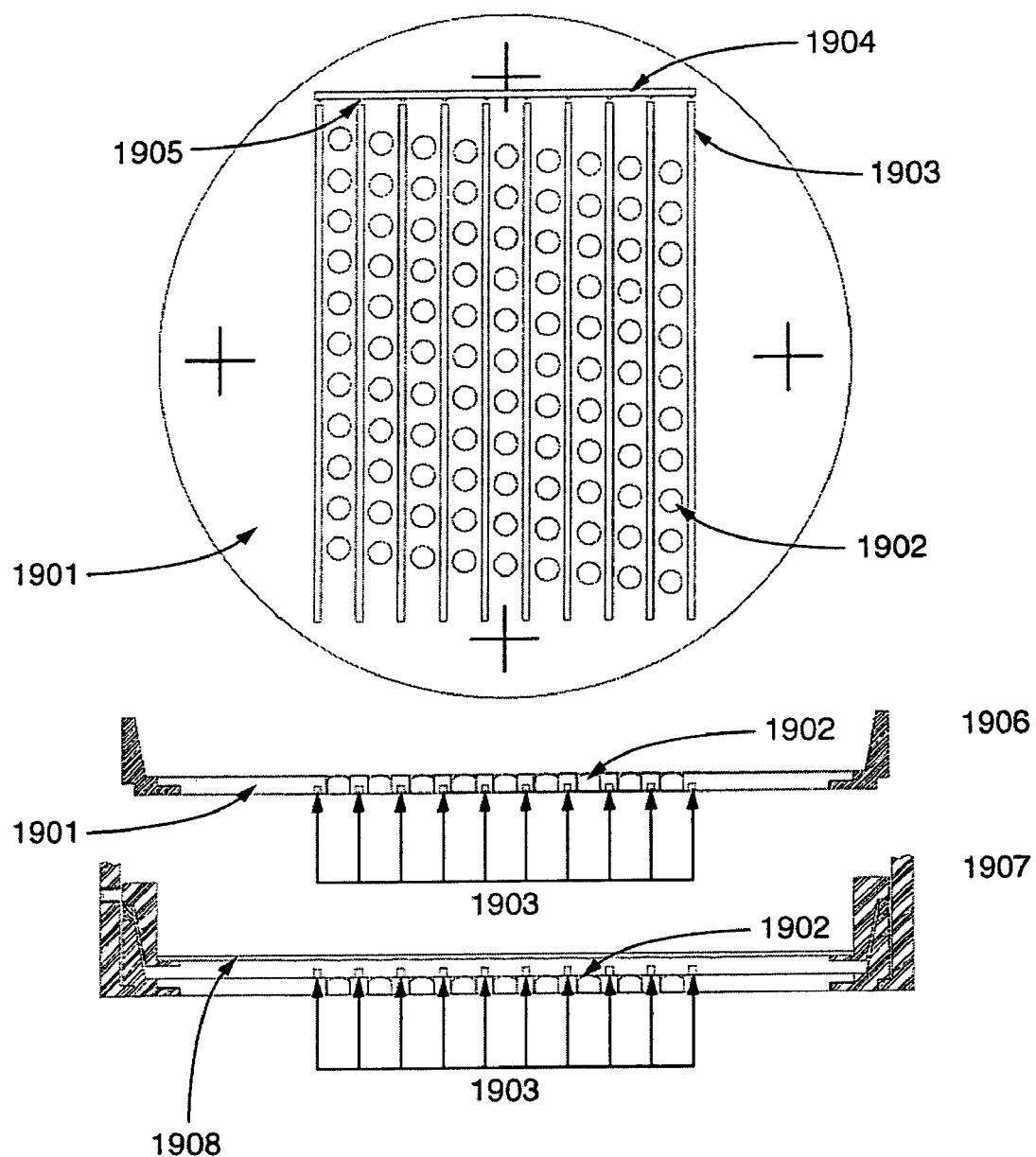
FIG. 19 is a schematic depiction of epi-illumination of an object using lightguides, according to the present invention.

FIG. 19 shows how epi-illumination of the object can be achieved using lightguides. If the composite base plate 1901 is opaque, then the configuration 1906 is preferred. In that case, the lightguides 1903 can be positioned within the composite base plate 1901 so that the bottom surfaces of the lightguides 1903 are flush with the bottom surface of the composite base plate 1901. If the composite base plate 1901 is light-transmitting, then the configuration 1907 is preferred. In that case, the lightguides can be positioned between the composite base plate 1901 and composite refractive plate 1908. Light emitting diodes (LEDs) 1905 arranged along a bar 1904 can be used to illuminate the lightguides 1903. The surfaces of the lightguides can be designed to scatter light from within each lightguide 1903 and downward towards the object. The design of the lightguides and lightguide surfaces to achieve a desired scattering of light from within the lightguide is described by Kawai, et al., in U.S. Pat. No. 5,499,112. Light exits from the lightguide with a relative large divergence angle to ensure that the entire object is illuminated. To improve efficiency of such an epi-illumination system, a lens 1905 may be used to couple light from each LED into the corresponding lightguide 1903.

Figure 11:
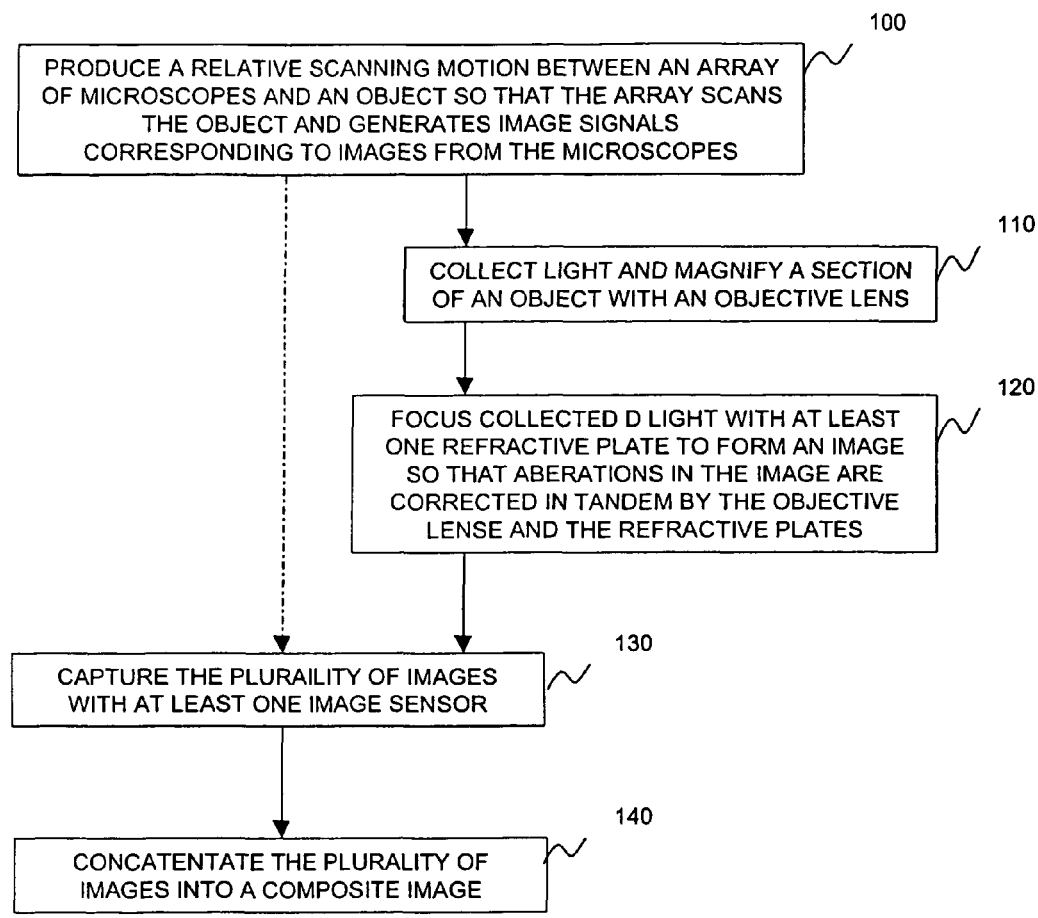
FIG. 11 is a flow chart illustrating imaging steps of the present invention.

Another embodiment of the present invention is shown in FIG. 11. The method depicted in FIG. 11, in general, includes the steps of imaging respective sections of an object with a plurality of optical elements and capturing corresponding representations of sections of the object from a plurality of image sensors. More specifically, FIG. 11 depicts that at step 100, sections of an object are imaged with an array of microscopes by producing a relative scanning motion between the array of microscopes and the object so that the array of microscopes scans the object longitudinally and generates an composite image signal corresponding to images from each microscope. At step 110, light is collected from a section of the object with an objective lens. Further, at step 120, light from the objective lens is focused with at least one refractive plate (i.e. a refractive member) adjacent to the objective lens such that the objective lens and the at least one refractive plate in tandem form an image from the section of the object and correct optical aberrations in the image from the section of the object. At step 130, the plurality of images are captured with at least one an image sensor located in an image plane of the microscope array. At step 140, the plurality of images is concatenated into a composite image.

The step of imaging at step 100 can include dry imaging with a numerical aperture ranging from NA=0.05 to NA<1.0, immersion imaging with a numerical aperture ranging from NA=0.05 to NA=0.95n, where n is the index of refraction of the immersion medium, imaging with a cubic phase plate located at a pupil plane to focus an object with a height variation beyond a depth of field of any of the microscopes or an object with a thickness greater than the depth of field of any of the microscopes, imaging with a composite refractive plate having an electronically controlled refractive index to permit dynamic focusing of the microscopes, imaging with a linear photodetector array located in an image plane of the microscope array such that scanning of the microscope array across the object forms line-by-line images of sections of the object and concatenating the line-by-line images into a composite image, or imaging with a multiple linear photodetector arrays located in an image plane of the MA with each photodetector array having at least one of a spectral color filter and a spectral band-width filter such that scanning of the MA across the sample forms line-by-line images of sections of the object and concatenating the line-by-line images into a color composite image. The step of imaging at step 100 can involve at least one of translating the microscope array longitudinally along the length of the object and axially away from the object to form a composite three-dimensional image of the substrate, transilluminating the object, and epi-illuminating the object.

Figure 12:
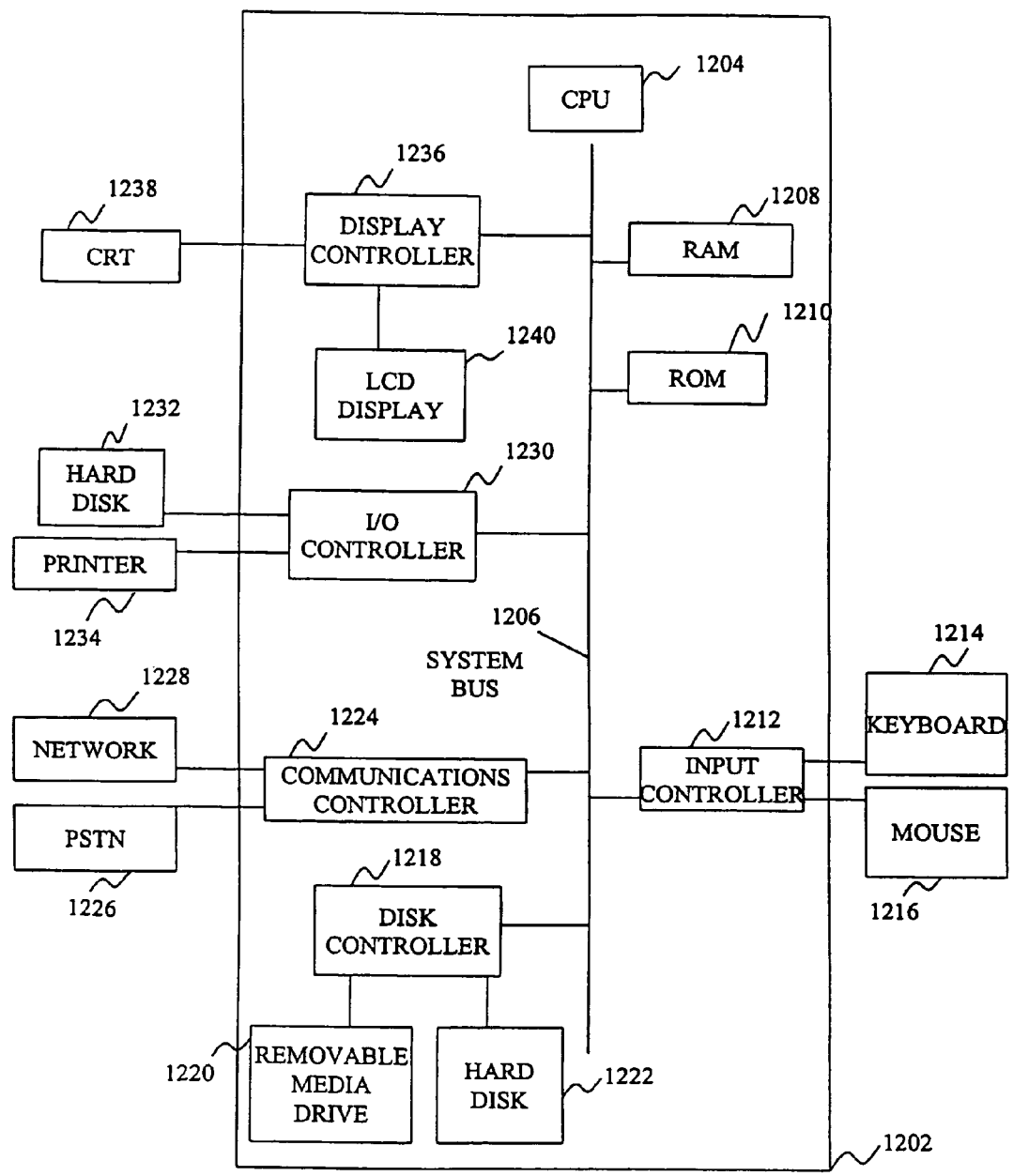
FIG. 12 is a schematic illustration of a computer system programmed to perform one or more of the special purpose functions of the present invention.

FIG. 12 is a block diagram of an exemplary computer 1202 such as for example the computer 32 shown in FIG. 5B that may be programmed to perform one or more of the special purpose functions of the present invention, including controlling or directing some or part of the afore-mentioned method steps. The computer 1202 is a personal computer, a portable computer, a computer workstation with sufficient memory and processing capability, or any device configured to work like a computer. In one embodiment, the computer 1202 is a device diagramatically shown in FIG. 12. In this embodiment, the computer 1202 includes a central processing unit 1204 (CPU) that communicates with a number of other devices by way of a system bus 1206. The computer 1202 includes a random access memory (RAM) 1208 that stores temporary values used in implementing any one of the method steps of the present invention.

The central processing unit 1204 is configured for high volume data transmission for performing a significant number of mathematical calculations in controlling the microscope array of the present invention. A Pentium III microprocessor such as the 1 GHz Pentium III manufactured by Intel Inc. may be used for CPU 1204. The processor employs a 32-bit architecture. Other suitable processors include the Motorola 500 MHz Power PC G4 processor and the Advanced Micro Devices 1 GHz AMD Athlon processor. Multiple processors and workstations may be used as well.

A ROM 1210 is preferably included in a semiconductor form although other read-only memory forms including optical medium may be used to host application software and temporary results. The ROM 1210 connects to the system bus 1206 for use by the CPU 1204. The ROM 1210 includes computer readable instructions that, when executed by the CPU 1204, perform different functions associated with controlling the microscope array of the present invention. An input control 1212 connects to the system bus 1206 and provides an interface with various peripheral equipment including a keyboard 1214 and a pointing device such as a mouse 1216 settles to permit user interaction with graphical user interfaces. The input controller 1212 may include different ports such as a mouse port in the form of a PS2 port or, for example, a universal serial bus (USB) port. The keyboard port for the input controller 1212 can be in the form of a mini-DIN port although other connectors may be used as well. The input controller 1212 may also include serial ports or parallel ports as well.

A disc controller 1218 is in the form of an IDE controller and connects via driving cables to a removable media drive 1220 which may be implemented as a floppy disc drive, as well as a hard disc drive 1222 and a CD-ROM drive (not shown). In addition, a PCI expansion slide is provided on a disc controller 1218, a motherboard that hosts the CPU 1204. An enhanced graphic port expansion slot is provided and provides 3-D graphics with fast access to the main memory. The hard disc 1222 may also include a CD drive that may be readable as well as write-able. A communication controller 1224 provides a connection to a network 1228, which can be a local area network, wide area network, a virtual private network (VPN), or an extranet. The communications controller 1224 can also provide a connection to a public switched telephone network (PSIN) 1226 for providing Internet access. In one embodiment, the networks 1228 and 1226 and the communication controller 1224 are connected by way of a plurality of connections including a cable-modem connection, digital subscriber line (DSL) connection, fiber optic connection, dial-up modem connection, and the like that connects to the communication controller 1224.

An input/output controller 1230 also provides connections to the external components such as an external hard disc drive 1232, a printer 1234, for example, by way of an RS 232 port and a CSI bus. The input/output controller 1230 can be connected to the MA 30 of the present invention.

A display controller 1236 interconnects the system bus 1206 to a display device, such as a cathode ray tube (CRT) 1238. The CRT can be used for display of the concatenated images as well as providing information about the operational status of the MA 30. While a CRT is shown, a variety of display devices may be used such as an LCD (liquid crystal display) 1240, or a plasma display device.

The present invention thus also includes a computer-based product that may be hosted on a storage medium and may include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product controlling the operation of the microscope array of the present invention can be written in a number of computer languages including but not limited to C,C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

The invention claimed is:

1. A scanning imaging system for imaging an object, comprising:
   a two-dimensional microscope array with a plurality of optical elements arranged in rows, said optical elements being disposed with respect to an image plane and configured to image respective sections of the object;
   a scanning mechanism for producing an imaging scan of the object as a result of a relative movement between the microscope array and the object;
   and a plurality of image sensors corresponding to said plurality of optical elements and configured to capture image data representative of said respective sections of the object imaged thereby;
   wherein said imaging scan is implemented along a single direction of scan across the object and said rows of the microscope array are staggered with respect to said direction of scan, such that each of the optical elements images a respective continuous strip of the object along said direction of scan during the imaging scan of the scanning mechanism.

2. The system of claim 1, wherein at least one of said optical elements comprises: a refractive member configured to control for aberrations in an image of the object.

3. The system of claim 2, wherein the refractive member includes a phase-mask optical element configured to permit the array to focus an object with an axial dimension variation beyond a depth of field of the optical elements.

4. The system of claim 2, wherein the refractive member is configured to include a material with an electrically or magnetically controlled refractive index.

5. The system of claim 4, wherein the refractive member is segmented such that segmented portions of the refractive member cover individual optical elements and provide independent focusing for the individual optical elements.

6. The system of claim 1, wherein said image data comprise magnified representations of said respective sections of the object.

7. The system of claim 1, wherein said plurality of optical elements are configured to be offset in two dimensions so as to produces respective images that do not overlap more than a predetermined amount.

8. The system of claim 1, wherein the optical elements are configured as a dry imaging system with a numerical aperture within a range from NA=0.05 to NA<1.0.

9. The system of claim 1, wherein the optical elements are configured as an immersion imaging system with a numerical aperture within a range from NA=0.05 to NA=0.95 n, where n is the index of refraction of the immersion medium.

10. The system of claim 1, wherein at least one of said optical elements comprises: an objective lens; and a refractive member disposed in tandem with the objective lens to control aberrations in an image from the object.

11. The system of claim 10, wherein the at least one refractive member comprises: at least one refractive plate including at least one corrective optical element.

12. The system of claim 11, wherein the refractive plate comprises: an array of the corrective optical elements.

13. The system of claim 12, wherein the corrective optical elements are formed by at least one of lithographically patterning, embossing, molding, and laser-printing.

14. The system of claim 12, wherein the corrective optical elements are fabricated from material selected from at least one of polymers, plastics, and glasses, said materials having substantially different indices of refraction.

15. The system of claim 14, wherein the corrective optical elements are fabricated by a sol-gel process which utilizes UV-activated sol gel material and UV photomask exposure and developing to define said corrective optical elements on the refractive plates.

16. The system of claim 14, wherein the corrective optical elements are fabricated by a sol-gel process which utilizes a laser to define said corrective optical elements on the at least one refractive plate.

17. The system of claim 14, wherein the corrective optical elements include at least one of an aspherical element, a lenslet, and a diffractive optical element.

18. The system of claim 1, wherein said scanning mechanism is configured to provide said imaging scan between the object and the microscope array such that said direction of scan is substantially normal to said rows of the microscope array; and said imaging system further comprising a concatenation device configured to concatenate said image data into a composite image of each said continuous strip of the object.

19. The system of claim 18, wherein the direction of scan is along a length of the object.

20. The system of claim 1, further comprising: a composite base plate configured to support all the optical elements in the microscope array.

21. The system of claim 1, further comprising: a refractive member including a phase-mask optical element configured to permit the array to image an object with a axial dimension beyond the depth of field of any one of the optical elements.

22. The system of claim 1, wherein the optical elements comprise: an objective lens having at least one conically derived surface.

23. The system of claim 1, wherein the optical elements comprise: an objective lens having at least one of a plano-convex lens, a convex-plano lens, a biconvex lens, a convex-concave lens, and a concave-convex lens.

24. The system of claim 1, wherein the optical elements comprise: an objective lens is made from a glass having a spatially varying index of refraction.

25. The system of claim 1, further comprising: a micro-optical table configured to locate and fix positions of the optical elements and the image sensors.

26. The system of claim 25, wherein the micro-optical table comprises: a substrate; and slots in said substrate to locate the optical elements and the image sensor, wherein the substrate comprises at least one of a silicon substrate, a glass substrate, and a polymer substrate.

27. The system of claim 26, wherein the micro-optical table further comprises: silicon springs integral to said slots and configured to attach the optical elements and the image sensor to the micro-optical table.

28. The system of claim 1, wherein the image sensors comprise: a linear photodetector array.

29. The system of claim 28, wherein the image sensor comprises: a plurality of linear photodetector arrays, at least one of said linear photodetector arrays having an optical path-length modifying member configured to image different object surfaces conjugate to the corresponding image plane.

30. The system of claim 29, wherein the linear photodetector arrays are located in an image plane of the array.

31. The system of claim 28, wherein the image sensor includes multiple linear photodetector arrays located in an image plane of the microscope array with individual photodetector arrays having at least one of a spectral color filter and a spectral band-width filter.

32. The system of claim 1, further comprising: a light source configured to illuminate the object by at least one of transillumination and epi-illumination of the object.

33. The system of claim 32, comprising: at least one of a waveguide and a lightguide on a base plate holding the optical elements and configured to transmit light to the object.

34. The system of claim 1, wherein the optical elements include at least one of a refractive optical element, reflective optical element, and a diffractive optical element.

35. The system of claim 1, further comprising: an axial translation device configured to provide axial translation between the object and the microscope array.

36. The system of claim 1, wherein said plurality of optical elements comprises individual optical elements disposed at a same axial distance from said image plane.

37. The system of claim 1, wherein said plurality of optical elements comprises individual optical elements disposed at respectively different axial distances from said image plane.

38. A scanning imaging system for imaging an object, comprising:
a two-dimensional microscope array with a plurality of optical elements arranged in rows, said optical elements being disposed with respect to an image plane and configured to image respective sections of the object;
a refractive member associated with said plurality of optical elements and configured to control aberrations in images from said respective sections of the object;
a scanning mechanism for producing an imaging scan of the object as a result of a relative movement between the microscope array and the object; and
a plurality of image sensors corresponding to said plurality of optical elements and configured to capture image data representative of said respective sections of the object imaged thereby;
wherein said imaging scan is implemented along a single direction of scan across the object and said rows of the microscope array are staggered with respect to said direction of scan, such that each of the optical elements images a respective continuous strip of the object along said direction of scan during the imaging scan of the scanning mechanism.

39. The array of claim 38, wherein the image data captured by the image sensors comprise magnified images.

40. The array of claim 38, wherein the at least one refractive member comprises: at least one refractive plate including at least one corrective optical element to control said aberrations.

41. The array of claim 40, wherein the corrective optical element includes at least one of an aspherical element, a lenslet, and a diffractive optical element.

42. The array of claim 38, wherein the optical elements include an objective lens having at least one conical surface.

43. The array of claim 38, wherein the optical elements include an objective lens having at least one of a piano-convex lens, a convex-piano lens, a biconvex lens, a convex-concave lens, and a concave-convex lens.

44. The array of claim 38, wherein the optical elements includes at least one of a refractive optical element, reflective optical element, and a diffractive optical element.

45. The array of claim 38, wherein said plurality of optical elements comprises individual optical elements disposed at the same axial distance from said plane.

46. The array of claim 38, wherein said plurality of optical elements comprises individual optical elements disposed at respectively different distances from said image plane.

47. A method for imaging an object, comprising:
imaging respective sections of the object with a two-dimensional microscope array having a plurality of optical elements arranged in rows, said optical elements being disposed with respect to an image plane of the microscope array and configured to image respective sections of the object;
producing an imaging scan of the object as a result of a relative movement between the microscope array and the object;
and capturing image data representative of said respective sections of the object from a plurality of image sensors;
wherein said imaging scan is implemented along a single direction of scan and said rows of the microscope array are staggered with respect to said direction of scan, such that each of the optical elements images a respective continuous strip of the object along the direction of scan during said imaging scan, said continuous strip being substantially free of overlap with continuous strips imaged by other optical elements.

48. The method of claim 47, wherein said direction of scan is substantially normal to said rows of the microscope array: and further comprising the step of concatenating said image data into a composite image of each said continuous strip of the object.

49. The method of claim 47, wherein the step of imaging comprises: dry imaging with a numerical aperture having a range from NA=0.05 to NA<1.0.

50. The method of claim 47, wherein the step of imaging comprises: immersion imaging with a numerical aperture having a range from NA=0.05 to NA=0.95 n, where n is the index of refraction of the immersion medium.

51. The method of claim 47, wherein the step of imaging comprises: imaging through a phase-mask optical element to focus an object with a dimension variation beyond a depth of field of the optical elements.

52. The method of claim 47, wherein the step of imaging comprises: imaging through an optical element with an electronically controlled refractive index.

53. The method of claim 52, comprising: dynamically focusing said optical element by electrically controlling said refractive index.

54. The method of claim 47, wherein the step of imaging further comprises: translating the array axially away from the object to form a composite three-dimensional image of the object.

55. The method of claim 47, wherein the step of imaging comprises: transilluminating the object.

56. The method of claim 47, wherein the step of imaging comprises: epi-illuminating the object.

57. The method of claim 47, wherein the step of capturing comprises: imaging with a linear photodetector array located in said image plane of the microscope array such that scanning the microscope array across the object forms line-by-line images of scanned sections of the object; and concatenating the line-by-line images into a composite image.

58. The method of claim 47, wherein the step of capturing comprises: imaging with multiple linear photodetector arrays located in an image plane of the microscope array with each photodetector array having at least one of a spectral color filter and a spectral band-width filter; scanning the array across the sample to form line-by-line images of scanned sections of the object; and concatenating the line-by-line images into a color composite image.

59. A microscope for imaging an object, comprising: means for imaging the object with a plurality of optical elements disposed with respect to an image plane and configured to image respective sections of the object; and means for capturing image data representative of said respective sections of the object from a plurality of image sensors;
wherein said plurality of optical elements is arranged in a two-dimensional microscope array with rows that are staggered with respect to a direction of scan, such that each of the optical elements images a respective continuous strip of the object along the direction of scan.

60. The microscope of claim 59, further comprising: means for concatenating said image data into a composite image of the object.

61. The means of claim 59, wherein the means for imaging comprises: means for dry imaging with a numerical aperture within a range from NA=0.05 to NA<1.0.

62. The microscope of claim 59, wherein the means for imaging comprises: means for immersion imaging with a numerical aperture within a range from NA=0.05 to NA=0.95 n, where n is the index of refraction of the immersion medium.

63. The microscope of claim 59, wherein the means for imaging comprises: means for imaging through a phase-mask optical element to focus an object with a dimension variation beyond a depth of field of the microscopes.

64. The microscope of claim 59, wherein the means for imaging comprises: means for imaging through an optical element with an electronically controlled refractive index.

65. The microscope of claim 64, wherein the means for imaging comprises: means for dynamically focusing said optical element by electrically controlling said refractive index.

66. The microscope of claim 59, wherein the means for imaging further comprises: means for translating the means for imaging in said direction of scan along a length of the object and means for translating the means for imaging axially away from the object to form a composite three-dimensional image of the object.

67. The microscope of claim 59, wherein the means for imaging comprises: means for transilluminating the object.

68. The microscope of claim 59, wherein the means for imaging comprises: epi-illuminating the object.

69. The microscope of claim 59, wherein the means for capturing comprises: means for imaging with a linear photodetector array located in said mage plane of the microscope array such that scanning the means for imaging across the object in said direction of scan forms line-by-line images of each said strip of the object; and means for concatenating the line-by-line images into a composite image.

70. The means of claim 59, wherein the means for capturing comprises: means for imaging with multiple linear photodetector arrays located in said image plane of the microscope array with each photodetector array having at least one of a spectral color filter and a spectral band-width filter.

* * * * *